C12) United States Patent
Kim et al.

(10) Patent No.: US 12,154,018 B2
(45) Date of Patent: Nov. 26, 2024

(54) NEURAL PROCESSING UNIT CAPABLE OF SWITCHING ANN MODELS

(71) Applicant: DEEPX CO., LTD., Seongnam-si (KR)

(72) Inventors: You Jun Kim, Suwon-si (KR); Ha Joon Yu, Seongnam-si (KR); Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/312,660

(22) Filed: May 5, 2023

(65) Prior Publication Data

US 2023/0316040 A1 Oct. 5, 2023

(30) Foreign Application Priority Data

Dec. 19, 2022 (KR) .................. 10-2022-0178058

(51) Int. Cl.
*G06N 3/04* (2023.01)
(52) U.S. Cl.
CPC ...................... *G06N 3/04* (2013.01)
(58) Field of Classification Search
CPC ........................................................ G06N 3/04
See application file for complete search history.

(56) References Cited

U.S. PATENT DOCUMENTS

| | | | | |
|---|---|---|---|---|
| 11,398,089 | B1* | 7/2022 | Jindal | G06V 10/82 |
| 2010/0325621 | A1* | 12/2010 | Andrade | G06F 8/443 |
| | | | | 717/156 |
| 2021/0373944 | A1* | 12/2021 | Lee | G06F 9/4881 |
| 2022/0051112 | A1* | 2/2022 | Wang | G06N 5/022 |
| 2022/0164667 | A1* | 5/2022 | Saki | G06V 10/751 |
| 2023/0144662 | A1* | 5/2023 | Tasinga | G06F 9/5094 |
| | | | | 718/105 |
| 2023/0222781 | A1* | 7/2023 | Kim | G06V 10/806 |
| | | | | 382/156 |

FOREIGN PATENT DOCUMENTS

| | | |
|---|---|---|
| KR | 10-2022-0059224 A | 5/2022 |
| WO | 2021/246835 A1 | 12/2021 |

OTHER PUBLICATIONS

Kim, Sunmok, Yangho Ji, and Ki-Baek Lee. "An effective sign language learning with object detection based ROI segmentation." 2018 Second IEEE International Conference on Robotic Computing (IRC). IEEE, 2018. (Year: 2018).*
Tsang, Chi-Ping. "Synthesizing neural network applications using computer algebra." Proceedings of 1993 International Conference on Neural Networks (IJCNN-93-Nagoya, Japan). vol. 1. IEEE, 1993. (Year: 1993).*

* cited by examiner

*Primary Examiner* — Vincent Gonzales
*Assistant Examiner* — Sidney Vincent Bostwick
(74) *Attorney, Agent, or Firm* — Bridgeway IP Law Group, PLLC; Jihun Kim

(57) ABSTRACT

A neural processing unit (NPU) mounted on a movable device for detecting object is provided. The NPU may comprise a plurality of processing elements (PEs), configured to process an operation of a first artificial neural network model (ANN) and an operation of a second ANN different from the first ANN; a memory configured to store a portion of a data of the first ANN and the second ANN; and a controller configured to control the PEs and the memory to selectively perform a convolution operation of the first ANN or the second ANN based on a determination data, wherein the determination data may include an object detection performance data of the first ANN and the second ANN, respectively.

24 Claims, 18 Drawing Sheets

NEURAL PROCESSING UNIT CAPABLE OF SWITCHING ANN MODELS

CROSS-REFERENCE TO RELATED APPLICATIONS

This application claims the priority of Korean Patent Application No. 10-2022-0178058 filed on Dec. 19, 2022, in the Korean Intellectual Property Office, the disclosure of which is incorporated herein by reference.

BACKGROUND OF THE DISCLOSURE

Technical Field

The present disclosure relates to an electronic device mounted on a fixed device or a movable device and equipped with an artificial intelligence semiconductor.

Background Art

Recently, research on electronic devices equipped with artificial intelligence semiconductors is being conducted.

Examples of the movable device include an autonomous vehicle, a robot, or a drone. For example, drones collectively are referred to unmanned aerial vehicles (UAVs) or uninhabited aerial vehicles (UAVs) in the form of airplanes or helicopters capable of flying and controlling autonomous flight without a pilot or induction of radio waves.

Drones are being used in increasingly expanding fields such as military and industrial use.

SUMMARY OF THE DISCLOSURE

Object detection and tracking accuracy may vary depending on the size and speed of the object being detected and tracked. Accordingly, a fixed device or a movable device should be able to improve the accuracy of object detection and tracking in various environments and conditions.

A movable device should make a quick decision in proportion to the moving speed of the device. Therefore, a movable device requires an artificial intelligence system having a processing speed corresponding to the high speed of the moving device.

A movable device should be able to recognize objects at great distances. Therefore, a movable device requires artificial intelligence systems that can effectively recognize distant objects.

A movable device should be able to fly for long periods of time. Therefore, movable device requires artificial intelligence systems that can operate with low power.

Therefore, an example of the present disclosure aims to provide a fixed or movable device equipped with an artificial intelligence system in order to meet the above demands.

According to an example of the present disclosure, a neural processing unit mounted on a movable device for detecting object is provided. The NPU may comprise a plurality of processing elements (PEs), configured to process an operation of a first artificial neural network model (ANN) and an operation of a second ANN different from the first ANN; a memory configured to store a portion of a data of the first ANN and the second ANN; and a controller configured to control the PEs and the memory to selectively perform a convolution operation of the first ANN or the second ANN based on a determination data. The determination data may include an object detection performance data of the first ANN and the second ANN, respectively.

The object detection performance data of each of the first ANN and the second ANN may be determined according to at least one environmental condition.

The object detection performance data of each of the first ANN and the second ANN may be determined based on a size of an image or a size of an object in the image.

The controller may be configured to generate a control signal based on the determination data.

The determination data may include information about flight altitude, height from sea level or height from ground, or information about a size of an image or a size of an object in an image.

The PEs may be configured to: pause or deactivate the operation of the first ANN and then perform the operation of the second ANN according to a control signal of the controller, or pause or deactivate the operation of the second ANN and then perform the operation of the first ANN according to the control signal of the controller.

The PEs may comprise: a first portion performing the operation of the first ANN according to a control signal of the controller, or a second portion performing the operation of the second ANN according to the control signal of the controller.

According to the control signal of the controller, the first portion may be minimized or deallocated among the PEs and the second portion may be allocated among the PEs.

Based on the control signal of the controller, the second portion may be minimized or deallocated among the PEs and the first portion may be maximized among the PEs.

According to the other example of the present disclosure, a neural processing unit (NPU) mounted on a movable device for detecting object is provided. The NPU may comprise: a plurality of processing elements (PEs) configured to perform operation of a first artificial neural network model (ANN) and a second ANN; a memory configured to store a portion of the first ANN and the second ANN; and a controller configured to control the PEs and the memory to selectively perform a convolution operation of the first ANN or the second ANN based on a size of an image or a size of an object in the image.

The PEs may comprise: a first portion performing the operation of the first ANN according to a control signal of the controller, or a second portion performing the operation of the second ANN according to the control signal of the controller.

The PEs may be configured to: pause or deactivate the operation of the first ANN and then perform the operation of the second ANN according to a control signal of the controller, or pause or deactivate the operation of the second ANN and then perform the operation of the first ANN according to the control signal of the controller.

According to the other example of the present disclosure, a neural processing unit (NPU) mounted on a movable device for detecting object is provided. The NPU may comprise: a memory configured to store information on at least one artificial neural network model (ANN) among a plurality of artificial neural network models (ANNs) including a first ANN and a second ANN; and a plurality of processing elements (PEs) for performing a convolution operation of the at least one ANN.

The ANNs may be configured to use at least one image obtained from at least one camera as input. A first portion among the PEs may be configured to be allocated to perform a first operation for the first ANN. A second portion among the PEs may be configured to be allocated to perform a second operation for the second ANN. The first portion and the second portion may be sequentially or simultaneously determined according to a control signal based on a determination data.

The control signal may be configured to command the PEs to perform switching between the first portion and the second portion.

The control signal may be configured to command the plurality of PEs to allocate or minimize or deallocate the second portion.

The control signal may be configured to be generated based on a first event.

The first event may be generated when a flight altitude, a height from sea level or a height from ground is measured to be greater than a particular upper threshold value, or when an object in at least one image is determined to be smaller than a particular lower limit threshold.

The first ANN may be set to consume lower power than the second ANN, and the second ANN may be set to consume more power than the first ANN.

According to the control signal of the controller, the first portion may be minimized or deallocated among the PEs and the second portion may be allocated among the PEs.

Based on the control signal of the controller, the second portion may be minimized or deallocated among the PEs and the first portion may be maximized among the PEs.

According to the other example of the present disclosure, a method for operating a neural processing unit (NPU) mounted on a movable device for detecting object is provided. The method may comprise: operating a first artificial neural network model (ANN) using a first group of processing elements among a plurality of processing elements (PEs); and operating a second ANN using a second group of PEs among the plurality of PEs according to a control signal based on a determination data. The operations of the first ANN and the second ANN may be performed sequentially or simultaneously.

The method may further comprise: dividing the plurality of PEs into the first group of PEs and the second group of PEs.

The method may further comprise: adjusting a first number of PEs of the first group and a second number of PEs of the second group, respectively.

According to the adjusting, among the plurality of PEs, a first number of PEs of the first group may be reduced and a second number of PEs of the second group may be increased.

According to the adjusting, among the plurality of PEs, a second number of PEs of the second group may be reduced and a first number of PEs of the first group may be increased.

According to examples of the present disclosure, a subject (e.g., a target) may be detected or tracked with high accuracy using a camera. More specifically, when the altitude of the movable device according to the conventional art rises, since the subject is captured in a considerably smaller size, there is a disadvantage in that detection or tracking accuracy may be lowered. However, according to examples of the present disclosure, even when the altitude increases, the accuracy of detection or tracking may be improved.

DETAILED DESCRIPTION OF THE EMBODIMENT

Figure 1:
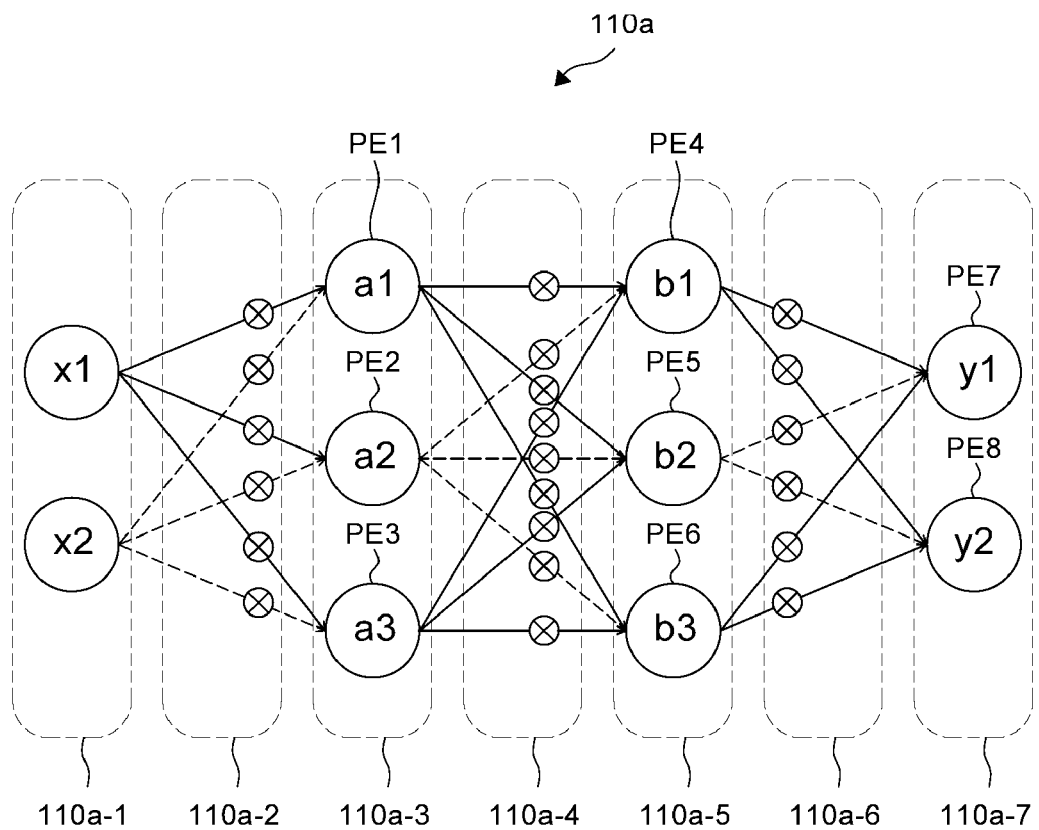
FIG. 1 is a schematic conceptual diagram illustrating an exemplary artificial neural network model.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted as that the present disclosure is limited to the examples described in the present specification or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present specification are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

<Definitions of Terms>

Here, in order to help the understanding of the disclosure proposed in the present specification, terminologies used in the present specification will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

<Artificial Intelligence>

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary artificial neural network model.

Hereinafter, an operation of an exemplary artificial neural network model 110a which may operate in the NPU 100 will be explained.

The exemplary artificial neural network model 110a of FIG. 1 may be an artificial neural network trained to perform various inference functions such as object detection or voice recognition.

The artificial neural network model 110a may be a deep neural network (DNN).

However, the artificial neural network model 110a according to the examples of the present disclosure is not limited to the deep neural network.

For example, the artificial neural network model can be a model such as Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes X1 and X2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

Figure 3:
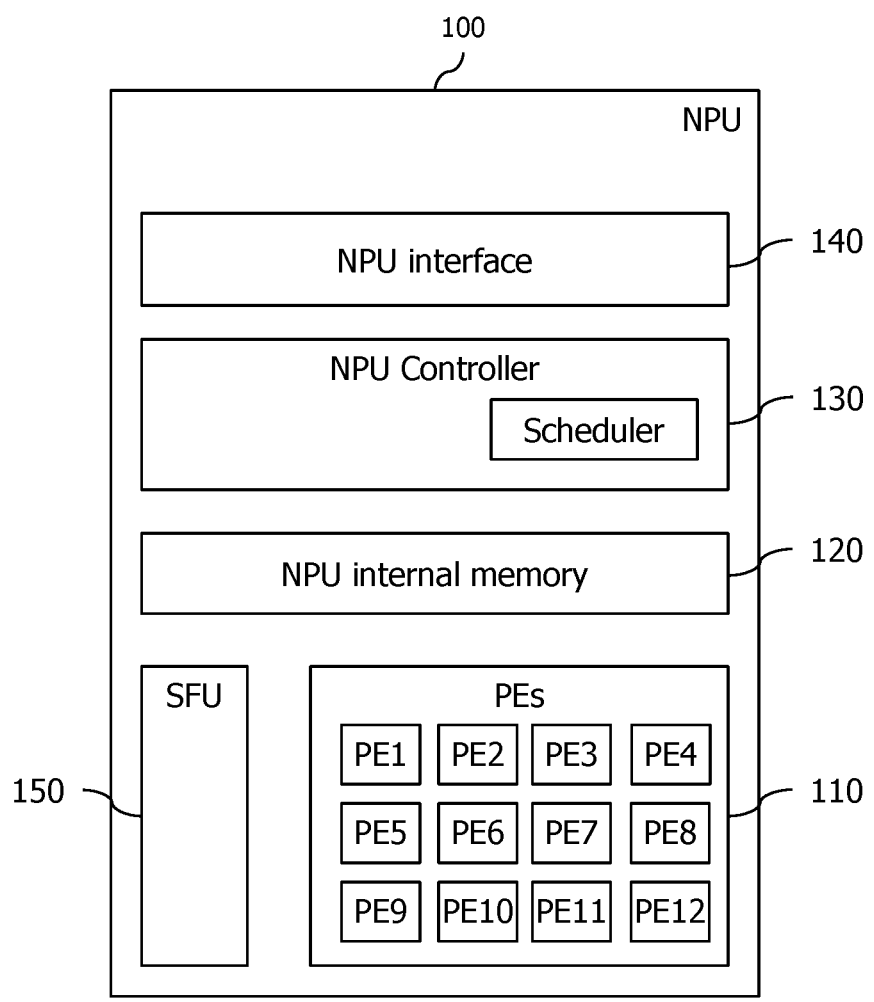
FIG. 3 is a schematic conceptual diagram illustrating a neural processing unit according to the present disclosure.

The first processing element PE1 of FIG. 3 may perform the MAC operation of the a1 node.

The second processing element PE2 of FIG. 3 may perform the MAC operation of the a2 node.

The third processing element PE3 of FIG. 3 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 3 may process the operation of the b1 node.

The fifth processing element PE5 of FIG. 3 may process the operation of node b2.

The sixth processing element PE6 of FIG. 3 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 3 may process the operation of node y1.

The eighth processing element PE8 of FIG. 3 may process the operation of node y2.

Figure 2A:
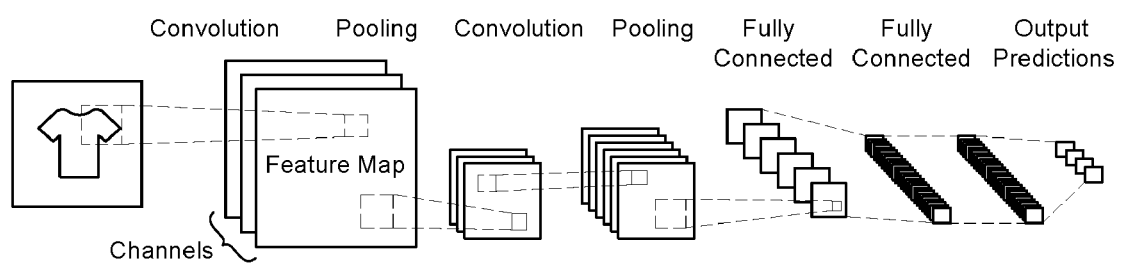
FIG. 2A is a diagram for illustrating the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
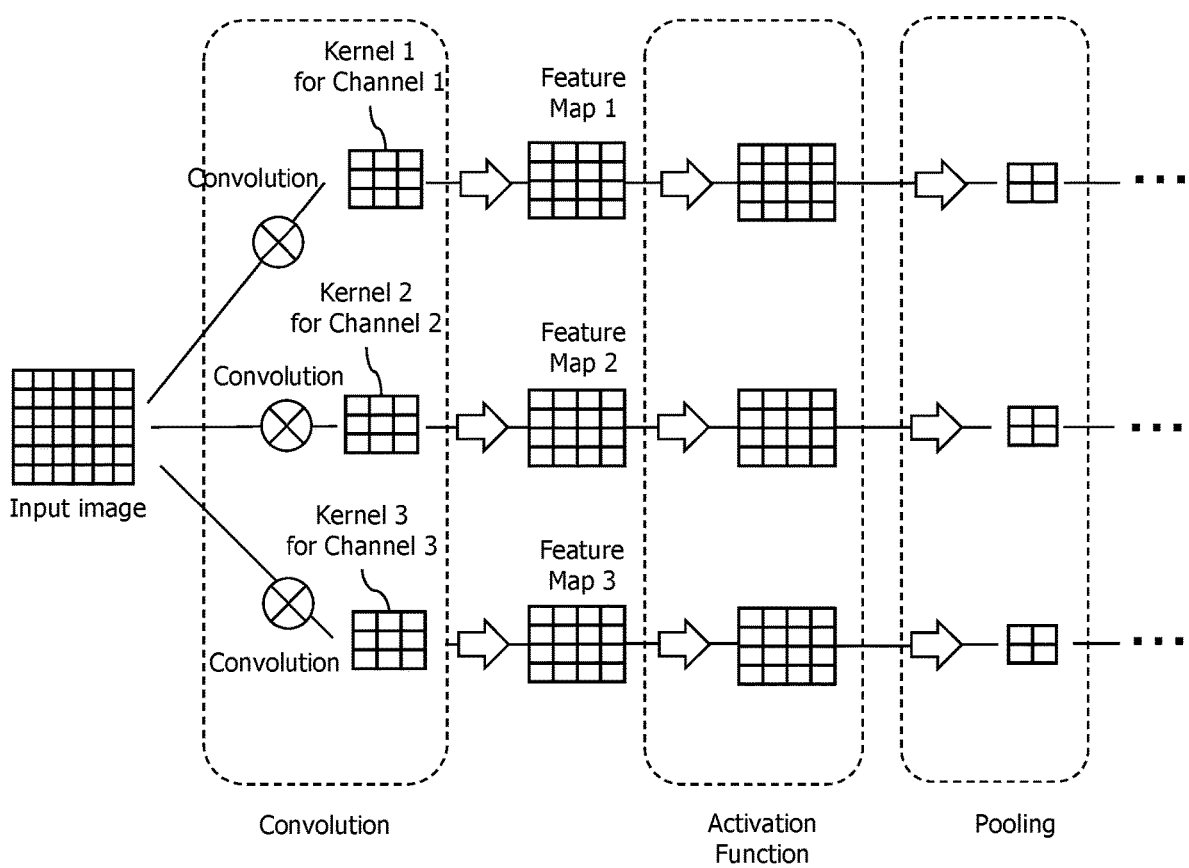
FIG. 2B is a comprehensive diagram showing the operation of a convolutional neural network in an easy-to-understand manner.

FIG. 2B is a comprehensive diagram showing the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the NPU 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected as shown in FIG. 8A. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

<Required Hardware Resources for CNN>

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network in which are collected artificial neurons which, when various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The NPU 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the NPU 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for additional algorithms.

The NPU 100 may be configured to include a plurality of processing elements 110 for processing convolution and matrix multiplication necessary for the above-described artificial neural network operation.

The NPU 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the NPU 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The NPU 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by a circuitry operation.

For example, an arbitrary circuit may operate as a plurality of the processing elements 110, or may operate as an NPU controller 130. The NPU controller 130 may be configured to perform the function of the control unit configured to control the artificial neural network inference operation of the NPU 100.

The NPU 100 may include the plurality of processing elements 110, the NPU internal memory 120 configured to store an artificial neural network model inferred from the plurality of processing elements 110, and the NPU controller 130 configured to control the operation schedule with respect to the plurality of processing elements 110 and the NPU internal memory 120.

The NPU 100 may be configured to process the feature map corresponding to the encoding and decoding method using SVC (Support Vector Classification) or SFC (Service Function Chaining).

The plurality of processing elements 110 may perform an operation for an artificial neural network.

SFU 150 may perform another portion of the operation for the artificial neural network.

The NPU 100 may be configured to hardware-accelerate the computation of the artificial neural network model using the plurality of processing elements 110 and the SFU 150.

The NPU interface 140 may communicate with various components connected to the NPU 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120.

The scheduler in the NPU controller 130 may schedule an operation order of the artificial neural network model to be processed by an NPU 100 based on the data locality information or the information about the structure of the artificial neural network model.

The scheduler in the NPU controller 130 may acquire a memory address value in which feature map of a layer of the artificial neural network model and weight data are stored based on the data locality information or the information about the structure of the artificial neural network model. For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may schedule an operation order of the plurality of processing elements 110 based on the data locality information or the information about the structure of the artificial neural network model, for example, the layout information of layers of the artificial neural network or the information about the structure of the artificial neural network model.

The scheduler in the NPU controller 130 may schedule based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the scheduler in the NPU controller 130 may control the NPU 100 according to a determined processing order of the NPU 100 based on the data locality information or the information about the structure of the artificial neural network model.

Moreover, the scheduler in the NPU controller 130 may operate the NPU 100 according to the determined the processing order based on the data locality information or the information about the structure of the artificial neural network model and/or data locality information or information about a structure of the NPU 100 to be used.

However, the present disclosure is not limited to the data locality information or the information about the structure of the NPU 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the NPU 100 by considering the data locality information or the information about the structure of the artificial neural network model and data locality information or information about a structure of the NPU 100. Furthermore, optimization of the processing is possible according to the determined processing order.

The plurality of processing elements 110 refers to a configuration in which a plurality of processing elements PE1 to PE12 configured to operate feature map and weight data of the artificial neural network is deployed. Each processing element may include a multiply and accumulate (MAC) operator and/or an arithmetic logic unit (ALU) operator, but the examples according to the present disclosure are not limited thereto.

Each processing element may be configured to optionally further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Figure 5:
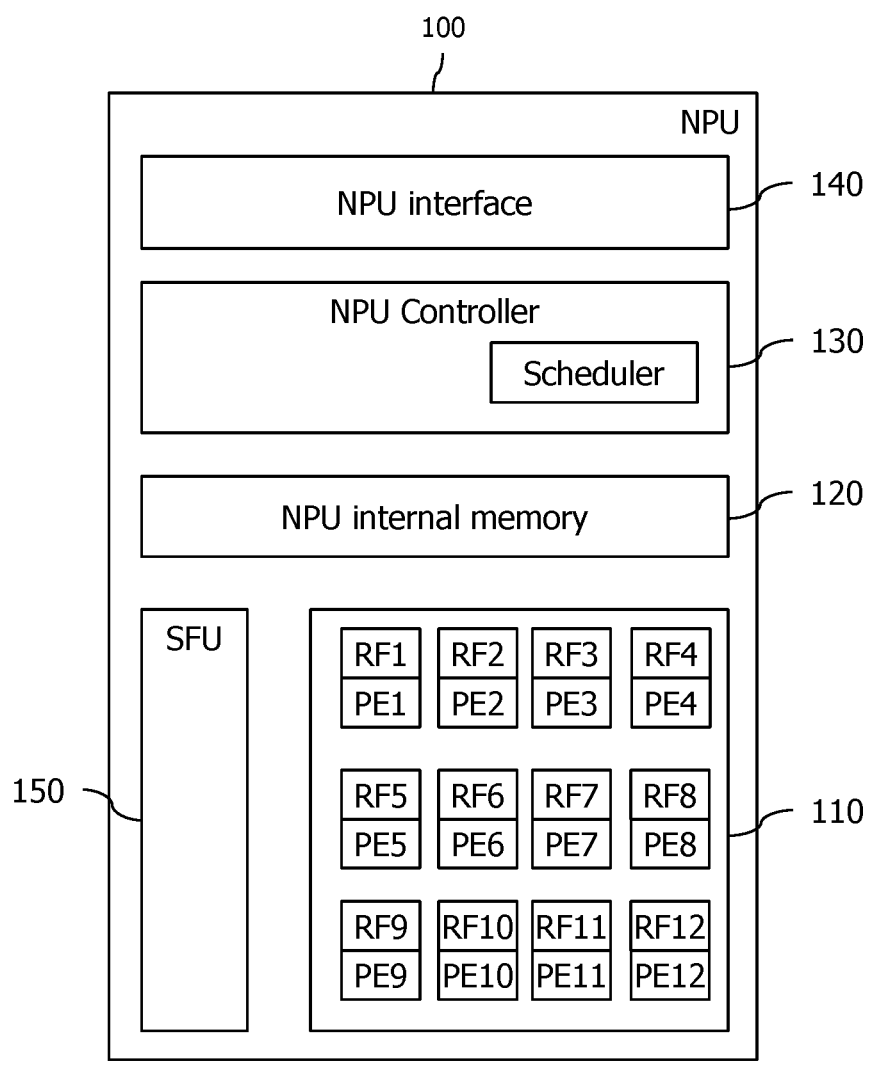
FIG. 5 is an schematic diagram illustrating a modified example of the NPU 100 shown in FIG. 3.

Even though FIG. 5 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 5 is just an example for the convenience of description and the number of the plurality of processing elements PE1 to PE12 is not limited to 12 or any other integer numbers. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the NPU 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
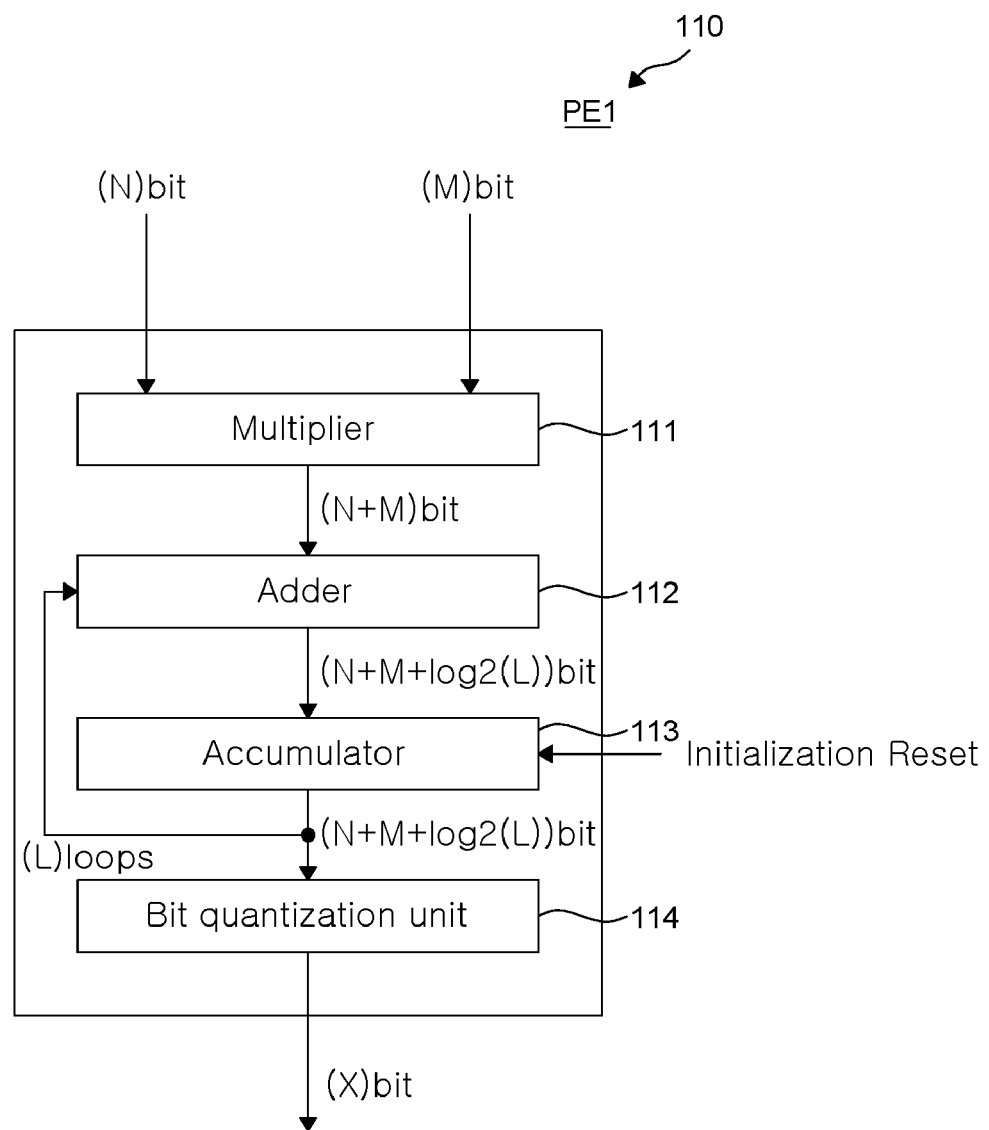
FIG. 4A is a schematic conceptual diagram illustrating one processing element (PE) among a plurality of processing elements that may be applied to the present disclosure.

FIG. 4A illustrates one processing element among a plurality of processing elements that may be applied to the present disclosure.

The NPU 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

The first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Additionally, when the heat generation is reduced, the possibility of the erroneous operation of the NPU 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the NPU 100 according to an example of the present disclosure may include a multiplier 111, an adder 112, and an accumulator 113. The bit quantizer 114 may be selected according to whether quantization is applied or not.

Figure 4B:
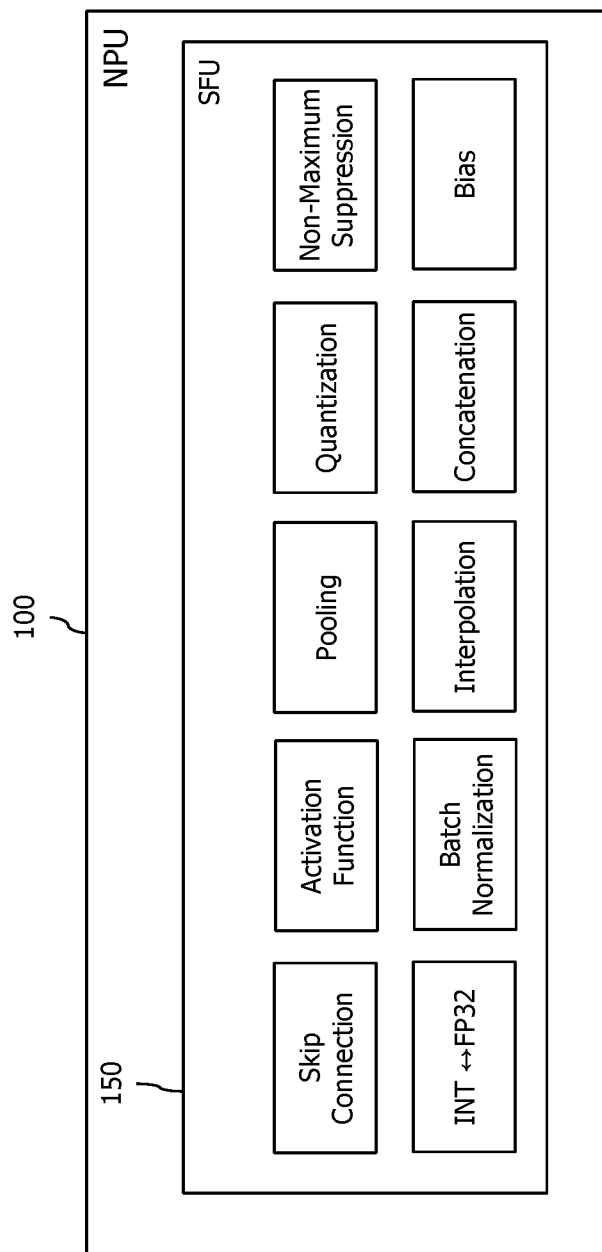
FIG. 4B is a schematic conceptual diagram illustrating an SFU (Special Function Unit) that can be applied to the present disclosure.

FIG. 4B is a schematic conceptual diagram illustrating an SFU that can be applied to the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the NPU 100 can be reduced. Meanwhile, in order to turn off some functional units, power gating may be used. Alternatively, clock gating may be performed to turn off some functional units.

FIG. 5 illustrates a modified example of the neural processing unit 100 of FIG. 3.

The NPU 100 of FIG. 5 is substantially the same as the NPU 100 exemplarily illustrated in FIG. 3, except for the shown addition of the plurality of processing elements 110. Thus, redundant description will be omitted for the brevity.

The plurality of processing elements 110 exemplarily illustrated in FIG. 5 may further include register files RF1 to RF12, each of which corresponds to processing elements PE1 to PE12 respectively, in addition to a plurality of processing elements PE1 to PE12.

The plurality of processing elements PE1 to PE12 and the plurality of register files RF1 to RF12 of FIG. 5 are just an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the NPU 100 operates. For additional explanation, the memory size of the register file may be determined in consideration of a data size, a required operating speed, and a required power consumption of the artificial neural network model to operate.

The register files RF1 to RF12 of the NPU 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

<A mobile device to which the present disclosure is applied>

Figure 6A:
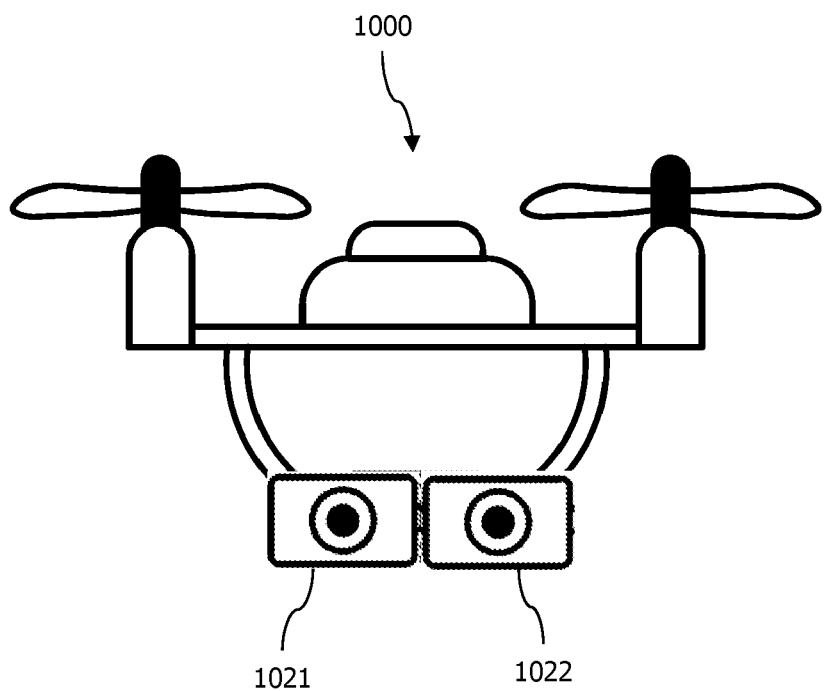
FIGS. 6A and 6B show examples of drones to which the present disclosure is applied.
Figure 6B:
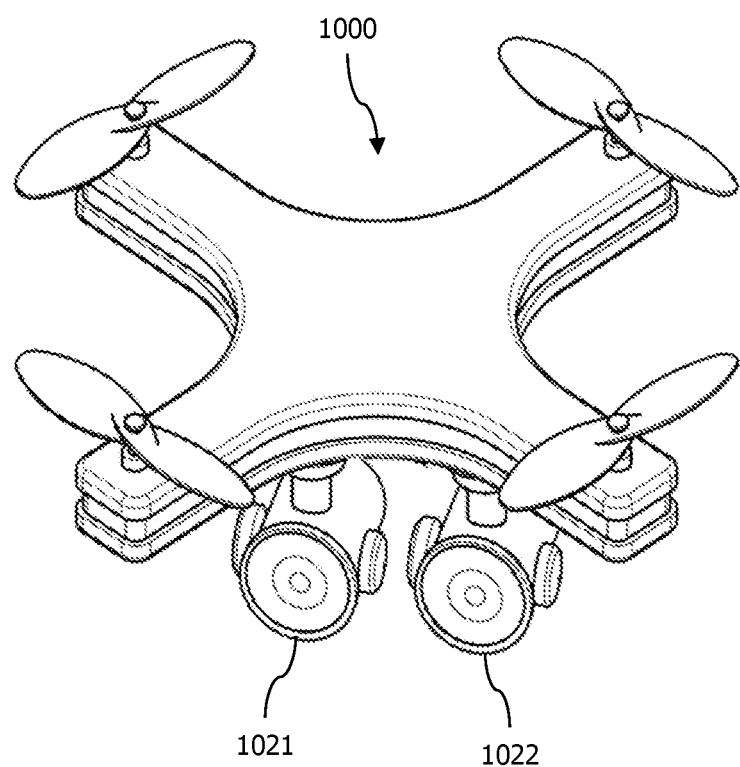

FIGS. 6A and 6B show examples of drones to which the present disclosure is applied.

Referring to FIGS. 6A and 6B, a movable device having an advanced artificial intelligence object detection function may capture a moving target object while tracking it.

A device according to the present disclosure may be configured to automatically steer a camera. Specifically, it may be configured to detect or track a specific subject (e.g., an arbitrary person) within an image captured by a camera installed in the device by controlling the camera.

A device according to the present disclosure is configured to predict a path or direction in which a target subject will move using the NPU. Accordingly, it may be configured to automatically steer a movable device or camera in a path or direction predicted by the device.

Referring to FIGS. 6A and 6B, one or a plurality of cameras may be mounted on the movable device 1000. The plurality of cameras may include a first camera 1021 and a second camera 1022.

For example, the first camera 1021 may be a telephoto camera. The second camera 1022 may be a wide-angle camera. That is, the second camera 1022 may have a larger angle of view than the first camera 1021.

Alternatively, the first camera 1021 may be a visible ray camera. The second camera 1022 may be at least one of an ultra violet camera, an infrared camera, a thermal imaging camera, and a night vision camera.

Figure 7:
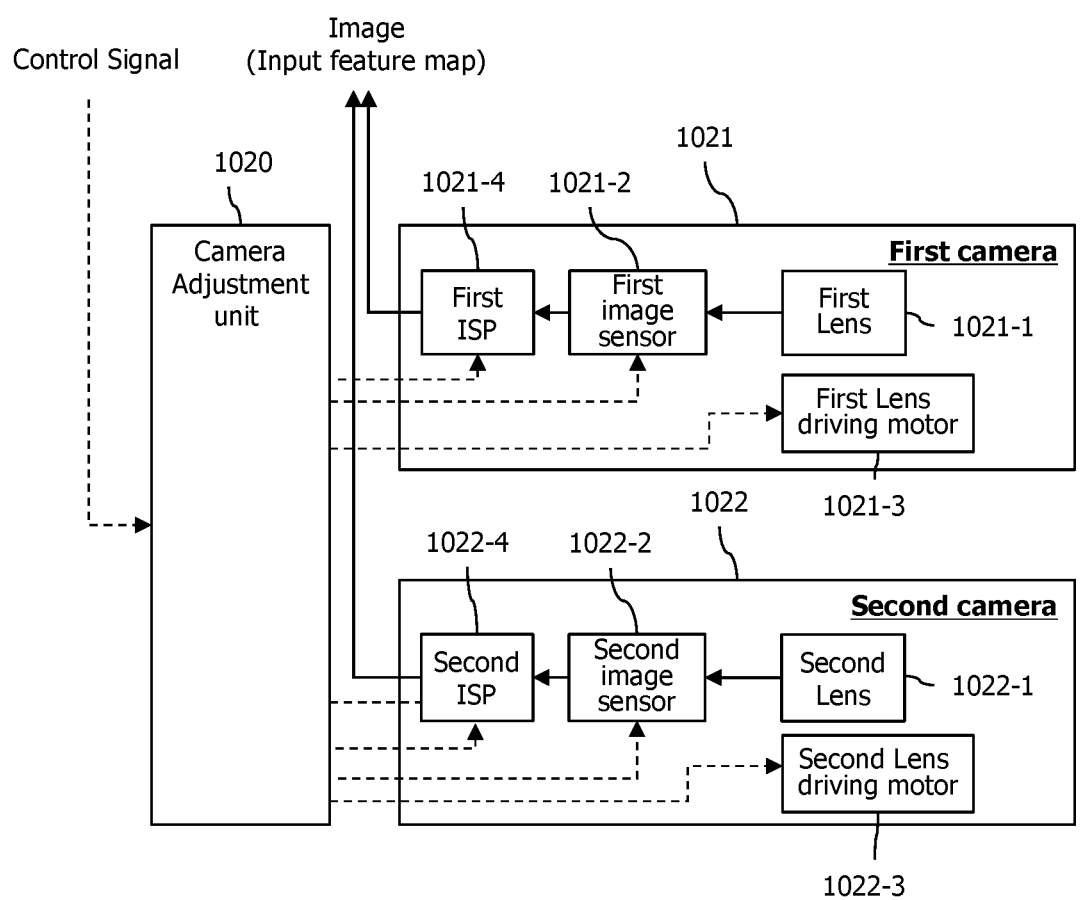
FIG. 7 is a block diagram showing the configurations of a plurality of cameras shown in FIGS. 6A and 6B.

FIG. 7 is a block diagram illustrating a set of configurations of a plurality of cameras shown in FIGS. 6A and 6B.

Referring to FIG. 7, the first camera 1021 may include a first lens 1021-1, a first image sensor 1021-2, a first lens driving motor 1021-3 physically adjusting the first lens 1021-1, and a first image signal processor (ISP) 1021-4.

The second camera 1022 may include a second lens 1022-1, a second image sensor 1022-2, a second lens driving motor 1022-3 physically adjusting the second lens 1022-1, and a second ISP 1022-4.

The first camera 1021 and the second camera 1022 may be connected to the camera adjustment unit 1020.

The camera adjustment unit 1020 may be connected to the first ISP 1021-4, the first image sensor 1021-2, and the first lens driving motor 1021-3 of the first camera 1021 to control them.

The camera adjustment unit 1020 may be connected to the second ISP 1022-4, the second image sensor 1022-2, and the second lens driving motor 1022-3 of the second camera 1022 to control them.

The camera adjustment unit 1020 may control the first image sensor 1021-2 or the first ISP 1021-4 of the first camera 1021. The camera adjustment unit 1020 may control the first image sensor 1021-2 so that the first camera 1021 may capture a higher resolution image. The first ISP 1021-4 may be configured to downscale (or downsize) the captured image.

The camera adjustment unit 1020 may control the second image sensor 1022-2 or the second ISP 1022-4 of the second camera 1022. The camera adjustment unit 1020 may control the second image sensor 1022-2 so that the second camera 1022 may capture a higher resolution image. The second ISP 1022-4 may be configured to downscale (or downsize) the captured image.

Figure 8:
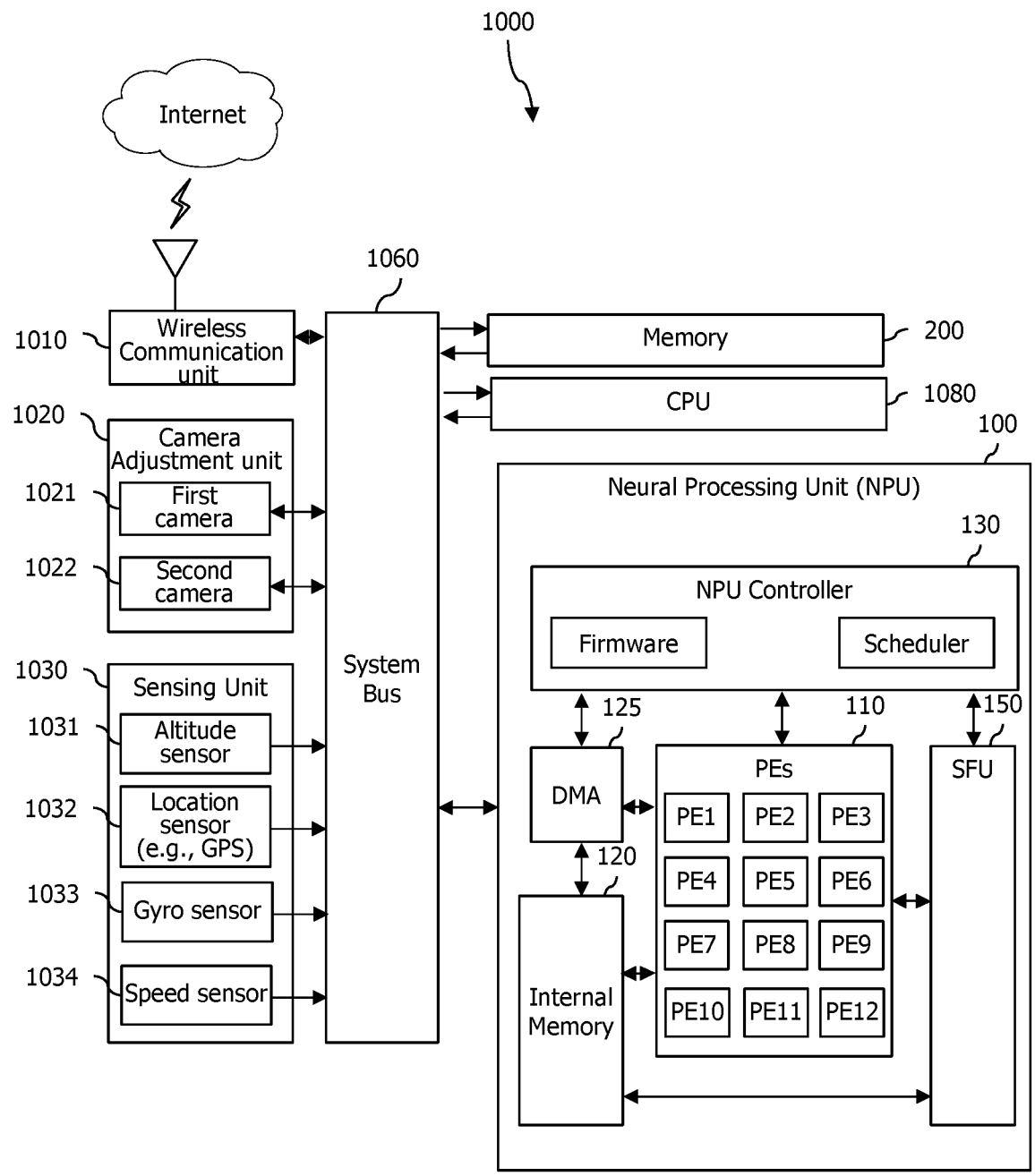
FIG. 8 is a block diagram schematically illustrating the configuration of the drone shown in FIGS. 6A and 6B.

FIG. 8 is a block diagram showing the configuration of the movable device shown in FIGS. 6A and 6B as an example.

Referring to FIG. 8, a movable device 1000 is shown in FIG. 1 or 3 may include an NPU 100, a memory 200, a wireless communication unit 1010, a camera adjustment unit 1020, a sensing unit 1030, a system bus 1060, and a CPU 1080.

The wireless communication unit 1010 may include one or more of a 4G communication unit, a 5G communication unit, a 6G communication unit, and a short-range communication unit. The 4G communication unit may be for Long Term Evolution (LTE) or LTE-Advanced (LTE-A). The 5G communication unit may be for 5G New Radio (NR). The short-range communication unit may support, for example, Wireless LAN (WLAN), Wi-Fi (Wireless-Fidelity), Wi-Fi (Wireless Fidelity) Direct, Bluetooth™, Radio Frequency Identification (RFID), Infrared Data Association (IrDA), Ultra-Wideband (UWB), ZigBee, Near Field Communication (NFC), Wireless Universal Serial Bus (Wireless USB), and the like.

The wireless communication unit 1010 may be used to transmit/receive a signal for adjusting the flight of a movable device, transmit a captured image, or transmit an inference result by the NPU.

Referring to FIG. 7, the camera adjustment unit 1020 may receive a control signal (or determination data) from the outside.

The camera adjustment unit 1020 may be configured to control the first image sensor 1021-2, and/or the first ISP 1021-4 of the first camera 1021 by a control signal (or determination data). The camera adjustment unit 1020 may provide a control signal (or determination data) corresponding to at least one of the first image sensor 1021-2, the first lens driving motor 1021-3, and the first ISP 1021-4 based on the received control signal (or determination data).

The camera adjustment unit 1020 may be configured to control the second image sensor 1022-2, and/or the second ISP 1022-4 of the second camera 1022 by a control signal (or determination data). The camera adjustment unit 1020 may provide a control signal (or determination data) corresponding to at least one of the second image sensor 1022-2, the second lens driving motor 1022-3, and the second ISP 1022-4 based on the received control signal (or determination data).

Here, a control signal (or determination data) input to the camera adjustment unit 1020 and a control signal (or determination data) input to the first image sensor 1021-2, the first lens driving motor 1021-3, and the first ISP 1021-4 may be substantially the same signal.

However, it is not limited thereto, and the control signal (or determination data) input to the camera adjustment unit 1020 and each control signal (or determination data) input to each of the first image sensor 1021-2, the first lens driving motor 1021-3, and the first ISP 1021-4 may be a signal converted to correspond to each element.

The camera adjustment unit 1020 may control the first image sensor 1021-2 or the first ISP 1021-4 by transmitting a control signal (or determination data) to the first image sensor 1021-2 or the first ISP 1021-4.

The camera adjustment unit 1020 may transmit a control signal (or determination data) to the first image sensor 1021-2 so that the first image sensor 1021-2 of the first camera 1021 can adjust the resolution and/or frame rate per second (FPS) of the captured image.

The camera adjustment unit 1020 may control the second image sensor 1022-2 or the second ISP 1022-4 by transmitting a control signal (or determination data) to the second image sensor 1022-2 or the second ISP 1022-4.

The camera adjustment unit 1020 may transmit a control signal (or determination data) to the second image sensor 1022-2 so that the second image sensor 1022-2 of the second camera 1022 can adjust the resolution and/or frame rate per second (FPS) of the captured image.

Further, the camera adjustment unit 1020 may transfer a control signal (or determination data) to the first ISP 1021-4 to allow the first ISP 1021-4 of the first camera 1021 to downscale or upscale the captured image.

Further, the camera adjustment unit 1020 may transfer a control signal (or determination data) to the second ISP 1022-4 to allow the second ISP 1022-4 of the second camera 1022 to downscale or upscale the captured image.

The sensing unit 1030 may include an altitude sensor 1031, a location sensor (e.g., GNSS (Global Navigation Satellite System) or GPS) 1032, a gyro sensor (also known as angular rate sensors or angular velocity sensor) 1033, and a speed sensor 1034. The altitude sensor 1031 may measure the height at which the movable device 1000 is floating/hovering from the ground. The location sensor 1032 may measure location coordinates of the movable device 1000. Also, the location sensor 1032 may measure the height at which the movable device 1000 is suspended from the ground. The speed sensor 1034 can measure acceleration as well as speed of the movable device. The sensing unit 1030 may transmit the measured data to the CPU 1080, to the Internet through the wireless communication unit 1010 or to a terminal of a user who controls the movable device 1000 through the wireless communication unit 1010.

The system bus 1060 may provide an interface connecting between the wireless communication unit 1010, the camera adjustment unit 1020, the sensing unit 1030, the memory 200, the CPU 1080, and the NPU 100.

The memory 200 may store information on a plurality of artificial neural network (ANN) models. The plurality of artificial neural network models may include a first artificial neural network model and a second artificial neural network model. In addition, the plurality of artificial neural network models may further include a third ANN model. The plurality of artificial neural network models may include a convolutional neural network (CNN) and a recurrent neural network (RNN). The CNN model can be used to detect an object in one image, and the RNN model can be used to predict an object using the time domain. In addition, the plurality of artificial neural network models may include region-based CNN (R-CCN), spatial pyramid pooling network (SPP-Net), you only look once (YOLO), single-shot multi-box detector (SSD), deconvolutional single-shot multi-box detector (DSSD), long-short term memory (LTSM), gated recurrent unit (GRU), and the like.

For example, the first artificial neural network model may be a type of CNN, such as Yolo. And, the second artificial neural network model may be SSD.

For example, the first artificial neural network model may be an artificial neural network model using an input feature map of a first size (e.g., 200×200). The second artificial neural network model may be an artificial neural network model using an input feature map of a second size (e.g., 320×320). In addition, the third artificial neural network model may be an artificial neural network model using an input feature map of a third size (e.g., 400×400).

Information about the artificial neural network model stored in the memory 200 may include information about the number of layers of the artificial neural network model, the number of channels per layer, and a weight matrix used for each channel in each layer.

Specifically, the memory 200 may include a machine code storage unit, an image storage unit, an output feature map storage unit, and a weight storage unit for each machine code. This will be described later with reference to FIG. 11.

As shown in FIG. 3 or FIG. 5, the NPU 100 may include a plurality of processing elements 110, an internal memory 120, an NPU controller 130, a special function unit (SFU) 150, and a direct memory access (DMA) 125 that accesses and controls the internal memory 120. Also, although not shown in FIG. 8, the NPU 100 may further include an NPU interface 140 as shown in FIG. 3 or 5.

The plurality of processing elements 110 and/or SFU 150 in the NPU 100 may perform operation of the trained artificial neural network model for each layer of the artificial neural network model to output an inference result for detecting or tracking a subject that is at least one object.

A plurality of processing element 110 in the NPU 100 may include a first group of processing elements allocated for a first operation for a first artificial neural network model, and a second group of processing elements allocated for a second operation for a second artificial neural network model. This will be described later with reference to FIG. 10A.

The internal memory 120 of the NPU 100 may retrieve and temporarily store information for the artificial neural network model for detecting or tracking at least one object from the memory 200 through the system bus 1060 using the DMA 125. That is, The internal memory 120 may store information on a plurality of artificial neural network models. As described above, the plurality of artificial neural network models may include a first artificial neural network model, a second artificial neural network model, or a third artificial neural network model. In addition, the internal memory 120 in the NPU 100 may temporarily store parameters such as an input feature map, an output feature map, an activation map, and a weight kernel for operation of an artificial neural network model. To this end, the internal memory 120 in the NPU 100 may include an input feature map storage unit, an output feature map storage unit, and a weight storage unit.

Specifically, the configuration of the internal memory 120 of the NPU 100 may be different depending on the structure of the artificial neural network model. For example, in the case of NPU 100 configured to process a CNN model, the internal memory 120 in the NPU 100 may include an input feature map storage unit, an output feature map storage unit, and a weight storage unit. However, this will be described in detail later with reference to FIG. 11.

The NPU controller 130 in the NPU 100 may further include a firmware storage unit in addition to the scheduler shown in FIG. 3 or 5.

The firmware storage unit may store, for example, a set of compiled machine codes and a set of commands. Alternatively, the set of plurality of machine codes may be stored in the internal memory 120.

For example, a set of plurality of machine codes may include a first set of machine code for a first artificial neural network model using an input feature map of a first size (e.g., 200×200×3) and a second set of machine code for a second artificial neural network model using an input feature map of a second size (e.g., 320×320×3). Additionally, the set of plurality of machine codes may further include a third set of machine codes for a third artificial neural network model using an input feature map of a third size (e.g., 400×400×3). In other words, the size of the input feature map may be changed according to a control signal (or determination data). Accordingly, a plurality of machine codes corresponding to the sizes of the plurality of input feature maps must be compiled respectively. In addition, the NPU 100 may switch to a corresponding machine code when the size of the input feature map is changed.

For example, a plurality of sets of machine codes may be configured to include different artificial neural network models. Here, the first artificial neural network model may have characteristics advantageous to recognizing small objects, and the second artificial neural network model may have characteristics advantageous to recognizing large objects.

In order to compile the machine code of each artificial neural network model, a compiler may be prepared in advance. In order to process a specific artificial neural network model, the compiler may schedule an optimal operation based on the size of an input feature map and structural data of the artificial neural network model. That is, the compiler may generate a machine code that minimizes the frequency of generating access commands to the memory 200 by analyzing the size of data corresponding to each layer of the artificial neural network model, and efficiently using the internal memory 120 of the NPU 100 accordingly.

In addition, the compiler may calculate the optimal number of tiles of the feature map and/or kernel for each layer based on the data size of the weight and feature map of each layer of an artificial neural network model and the memory size of the internal memory 120 of the NPU 100. As the size of the input feature map increases and the memory size of the internal memory 120 decreases, the number of tiles may increase. As the size of the input feature map decreases and the memory size of the internal memory 120 increases, the number of tiles may decrease. Accordingly, the compiler may generate a plurality of sets of machine codes for the artificial neural network model corresponding to the optimal number of tiles. That is, the number of tiles should be compiled differently according to the size of the input feature map.

That is, the number of machine codes included in the set that can be provided may correspond to the number of sizes of switchable input feature maps input to the NPU 100. For example, when the sizes of the switchable input feature maps are (200×200×3) and (400×400×3), the number of machine codes included in the set may be two.

Index information on a set of a plurality of machine codes may be stored in a firmware storage unit in the NPU controller 130. At the initial stage of operation of the movable device 1000, the CPU 1080 may load index information for a plurality of machine code sets from the firmware storage unit into the NPU controller 130, and then store the index information in the cache memory in the CPU 1080.

After determining the movement path or direction of the movable device 1000, the CPU 1080 may control the movable device 1000 to move in the determined movement path or direction. To this end, the CPU 1080 may receive measurement data (i.e., environmental condition data) from the sensing unit 1030.

Specifically, the CPU 1080 may control flight of the movable device 1000. However, the movable device of the present disclosure is not limited to flying objects, and can be extended to devices movable on land, water, underwater, and near-earth space. Specifically, the CPU 1080 may control flight of the movable device 1000. However, the movable device of the present disclosure is not limited to flying objects, and can be extended to devices movable on land, water, underwater, and near-earth space.

For example, the CPU 1080 may determine a flight path, flight speed, and flight altitude of the movable device 1000 while comparing location information measured by the location sensor 1032 with destination location information. In addition, the CPU 1080 may compare the determined flight speed and the determined altitude with measurement values obtained from the altitude sensor 1031, the gyro sensor 1033, and the speed sensor 1034 to determine whether the movable device 1000 is in normal flight status. Therefore, the movable device 1000 can continuously control the flight.

The CPU 1080 may receive images captured by the first camera 1021 and the second camera 1022. Also, the CPU 1080 may receive an inference result (i.e., an object detection or tracking result) from the NPU 100.

The CPU 1080 may transmit a control signal (or determination data) to the camera adjustment unit 1020 to increase the accuracy of detection or tracking.

For example, when the at least one object is detected or tracked with a confidence level lower than the first threshold value, the control signal (or determination data) may be generated and transmitted to the camera adjustment unit 1020.

The confidence level may be a value of 0 to 1, and the confidence level of 0.0 may mean that the inference accuracy of the detected object class is 0%. A confidence level of 0.5 may mean that the inference accuracy of the class of the sensed object is 50%. A confidence level of 1.0 may mean that the inference accuracy of the class of the sensed object is 100%. The threshold value may be a value of 0 to 1, inclusively.

Based on a control signal (or determination data), the first ISP 1021-4 or the second ISP 1022-4 may process an image or a series of images. Since a video or a series of images is input to the NPU 100, they can be called as an input feature map In addition, in order to increase tracking accuracy, the CPU 1080 may select one of a plurality of machine code sets stored in the cache memory and transmit it to the NPU controller 130 of the NPU 100.

More specifically, the CPU 1080 may receive flight altitude information and information about sea level or height from the ground from the altitude sensor 1031 or the location sensor 1032 of the sensing unit 1030. If the flight altitude is increased (i.e., the height of a drone from the sea level or the ground is increased), the size of the object in the image may become smaller, and the object may be detected with a confidence level lower than the first threshold, or the detection may fail. Therefore, in order to increase the accuracy of detection or tracking, the CPU 1080 may select, from among a plurality of machine code sets, a set of machine code suitable for handling the increased flight altitude. That is to say, the selected set may be a set of machine code for an artificial neural network model suitable for a corresponding flight altitude. The CPU 1080 may transmit index information on the selected set of machine code to the NPU controller 130 of the NPU 100.

Figure 9:
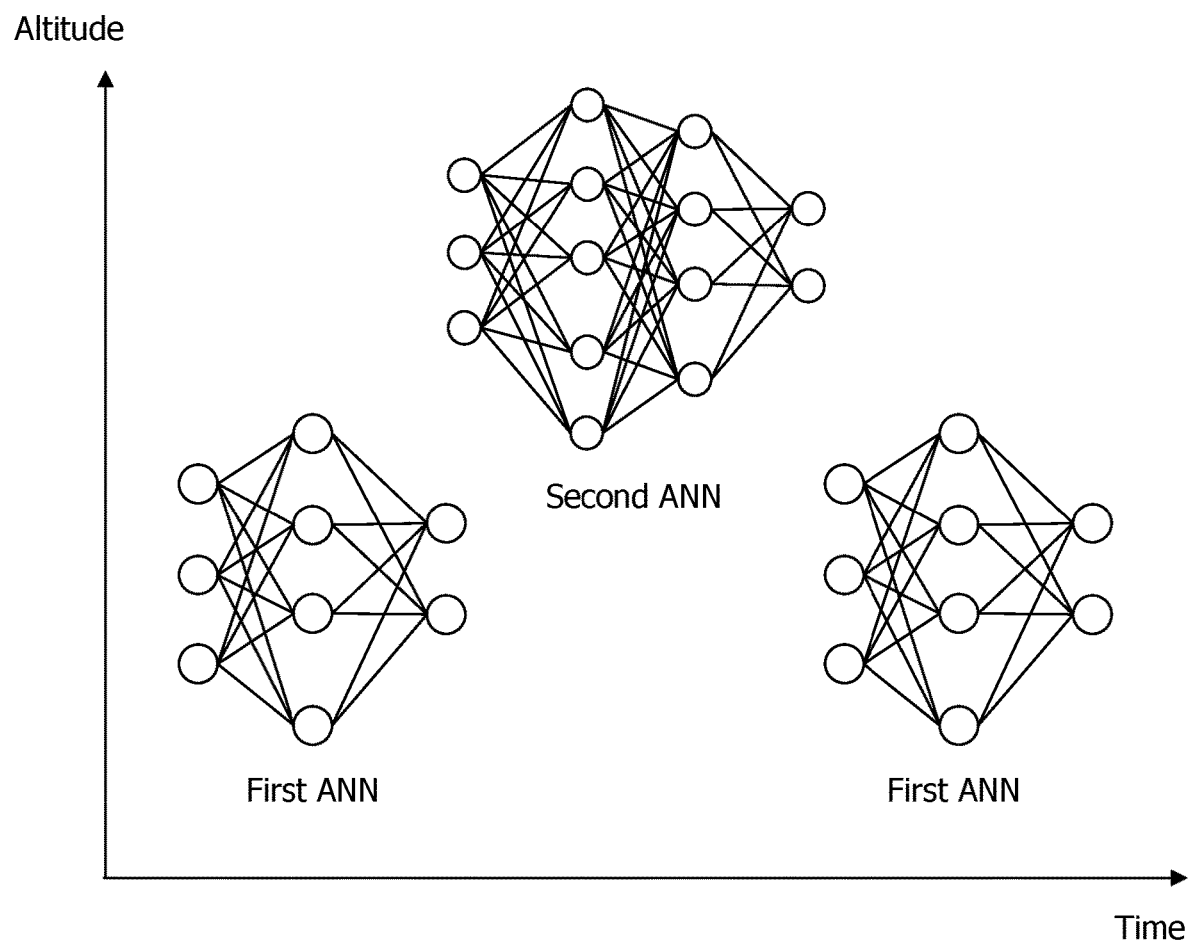
FIG. 9 is a conceptual diagram illustrating an example of switching artificial neural network models according to altitude.

FIG. 9 is a conceptual diagram illustrating an example of switching artificial neural network models according to altitude.

As can be seen with reference to FIG. 9, when the flight altitude, the height from the sea level, or the height from the ground is low, that is, when it is measured to be lower than an arbitrary lower limit threshold, the first artificial neural network model can be used.

However, when the flight altitude, the height from the sea level, or the height from the ground rises and is measured to be greater than a particular upper limit threshold value, the second artificial neural network model may be used. For example, when the height from the sea level or the height from the ground rises, an object (i.e., a subject) may be obtained smaller than a particular lower limit threshold in an image captured by the camera. As such, since the size of an object (i.e., subject) in the image is relatively small, the object may be detected by the NPU 100 with a confidence level lower than the first threshold or the detection may fail. In this case, the first artificial neural network model may be switched to the second artificial neural network model.

Thereafter, when the flight altitude, the height from sea level, or the height from the ground is lowered than the lower limit threshold value, the first artificial neural network model may be used again to replace the second artificial neural network model.

Information about the strengths and weaknesses of each artificial neural network model can be analyzed in advance. Information on the strengths and weaknesses of each artificial neural network model includes parameter size, amount of computation required for one inference, amount of power consumed for one inference, and object detection accuracy according to object size.

For example, the first artificial neural network model may measure 5% or more higher detection accuracy for an object having a size of 50×50 pixels than the second artificial neural network model. In this case, the CPU 1080 may command the NPU 100 to process an object detection operation using the first artificial neural network model, based on previously analyzed information.

For example, the object detection accuracy of the second artificial neural network model for an object having a size of 25×25 may be measured to be 3% or more higher than that of the first artificial neural network model. In this case, the CPU 1080 may command the NPU 100 to process an object detection operation using the second artificial neural network model, based on previously analyzed information.

Figure 10A:
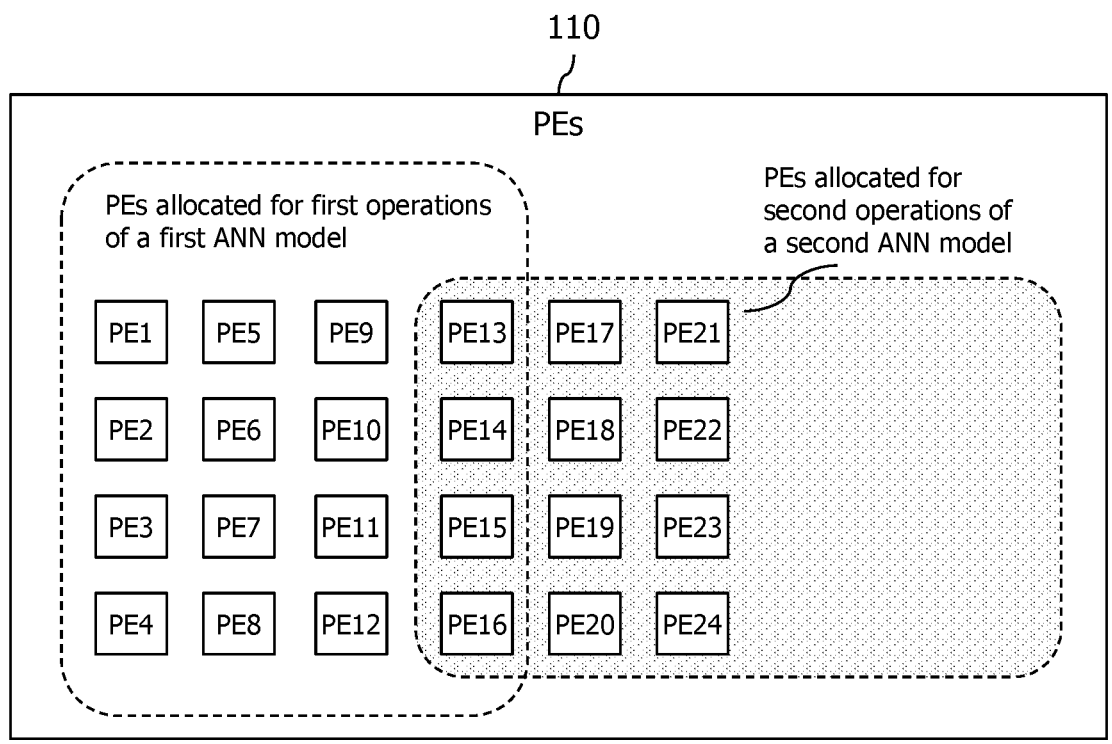
FIG. 10A is a schematic diagram illustrating PEs to which calculations of a plurality of neural network models are assigned.

FIG. 10A is an illustrative diagram illustrating PEs to which operations of a plurality of neural network models are assigned.

FIG. 10A shows that a total of twenty-four PEs exist, illustratively from PE1 to PE24. PEs of the first group allocated for the first operation for the first artificial neural network model may be a total of sixteen from PE1 to PE16. The PEs of the second group allocated for the second operation for the second artificial neural network model may be PE17, PE18, PE19, PE20, PE22, PE23, and PE24, a total of eight.

The number of PEs in the first group and the number of PEs in the second group may be time-varying. For example, when switching from the first artificial neural network model to the second artificial neural network model starts, among a total of 24 PEs, twenty PEs may be assigned to the first group, and the remaining four PEs may be assigned to the second group. When a certain time or a certain clock cycle elapses after the switching to the second artificial neural network model starts, among a total of twenty-four PEs, twelve PEs may be assigned to the first group, and the remaining twelve PEs may be assigned to the second group.

The number of PEs of the first group and the number of PEs of the second group may be determined based on the weight of each layer in each artificial neural network model, the data size of the feature map, and the memory size of the internal memory 120 of the NPU 100. Also, the number of PEs in the first group and the number of PEs in the second group may be set based on the machine code set.

Figure 10B:
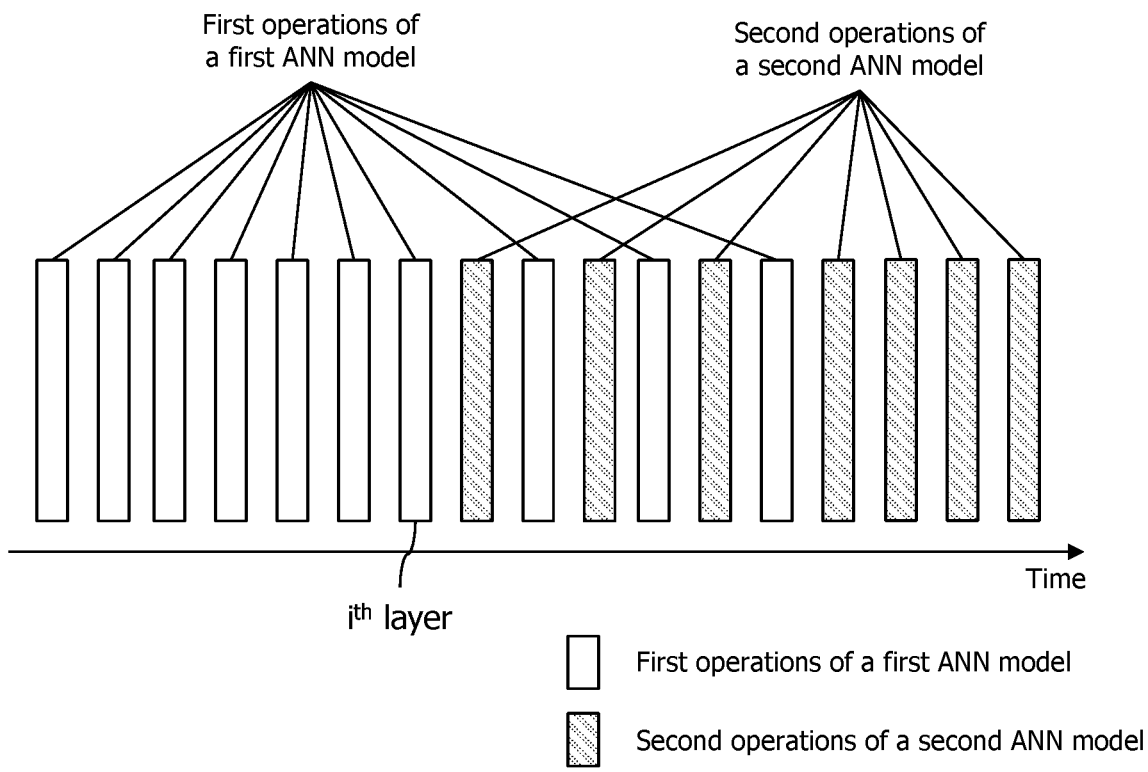
FIG. 10B shows an example in which calculations are performed on a plurality of neural network models.

FIG. 10B shows an example in which calculations are performed on a plurality of neural network models.

As can be seen with reference to FIG. 10B, first operations for the first artificial neural network model are performed. When the operation for the $i^{th}$ layer of the first artificial neural network model is performed, the second operation for the second artificial neural network model may be started. As shown, the first operation for the first artificial neural network model and the second operation for the second artificial neural network model may be performed in a time division manner.

Referring to FIGS. 10A and 10B together, a total of sixteen PEs from PE1 to PE16 may be allocated for calculation for the first artificial neural network model. Then, when an operation is performed on the $i^{th}$ layer of the first artificial neural network model, the PE10, PE11, PE14, PE15, and PE16 among PE1 to PE16 may be reallocated for the operation of the second artificial neural network model. That is, subsequent operations of the first artificial neural network model can be performed only by the remaining PEs, that is, PE1, PE2, PE3, PE4, PE5, PE6, PE7, PE8, PE9 and PE13.

As shown, the first operations for the first artificial neural network model and the second operations for the second artificial neural network model may be performed in parallel or time division.

In addition, as illustrated, the first group of PEs allocated for the operation of the first artificial neural network model and the second group of PEs allocated for the operation of the second artificial neural network model may be partially the same or completely different from each other.

In FIG. 10B, it is illustrated that when an operation for the $i^{th}$ layer of the first artificial neural network model is performed, a second operation for the second artificial neural network model starts, but other modifications/variations are possible.

For example, the second operation for the second artificial neural network model may be started based on information about the operation order of the plurality of ANNs.

The information on the operation order may include one or more of layer information, kernel information, processing time information, remaining time information, and clock information.

The information on the layer may indicate an $i^{th}$ layer among all layers of the first artificial neural network model. The operation for the second artificial neural network model may start after the calculation for the $i^{th}$ layer of the first artificial neural network model starts.

The information on the kernel may indicate a $k^{th}$ kernel among all kernels of the first artificial neural network model. The operation for the second artificial neural network model may start after the operation for the $k^{th}$ kernel of the first artificial neural network model starts.

The information on the processing time may indicate a time elapsed after performing an operation for the first artificial neural network model. An operation for the second artificial neural network model may be started after the elapsed time.

The information on the remaining time may indicate time remaining until operations of the first artificial neural network model are completed. An operation for the second artificial neural network model may be started before reaching the remaining time.

Figure 11:
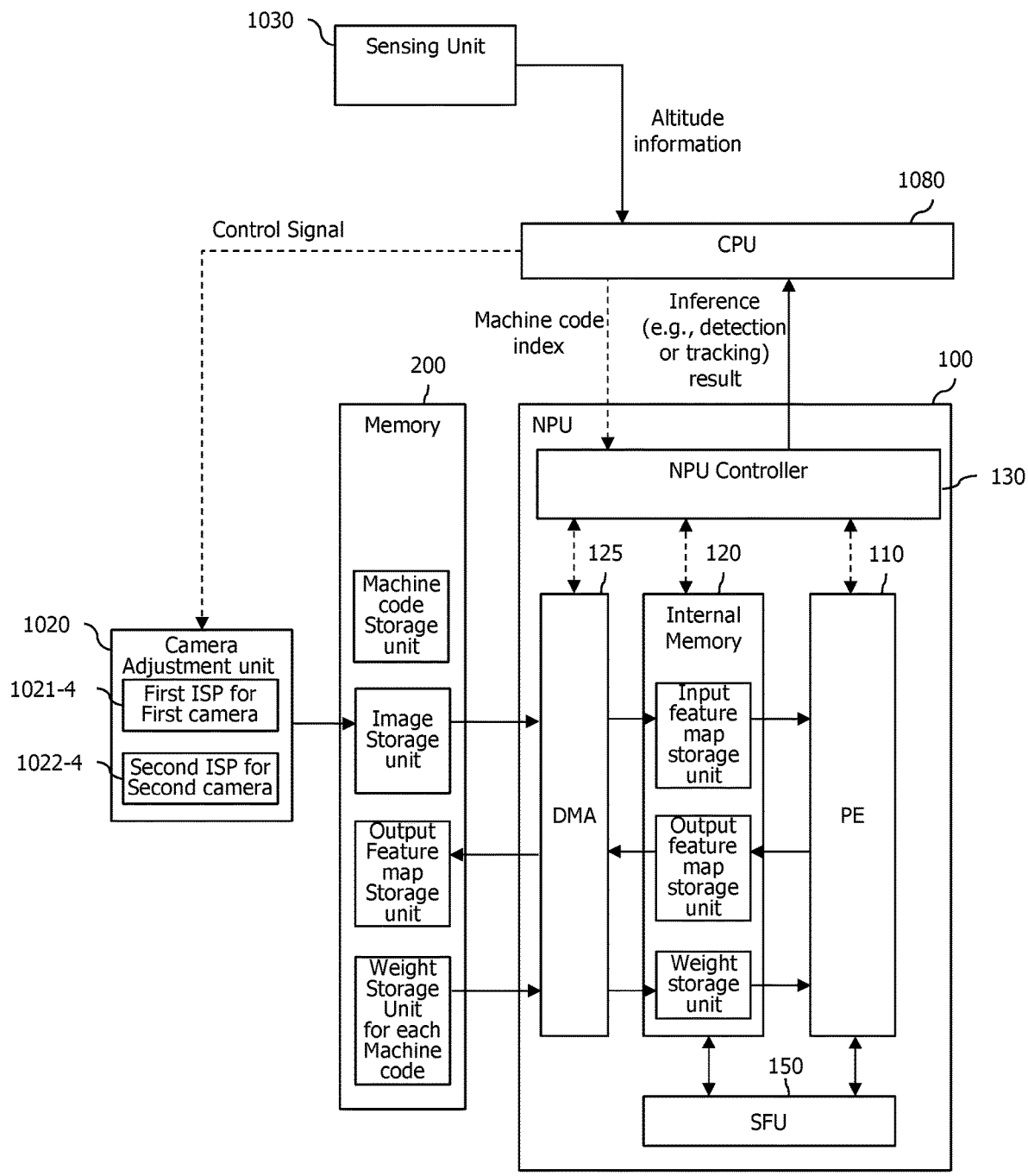
FIG. 11 is a block diagram showing the configuration shown in FIG. 8 from a major operational point of view.

FIG. 11 is a block diagram showing the configuration shown in FIG. 8 from a major operational point of view.

A system bus 1060 as shown in FIG. 8 (which is not shown in FIG. 11) may be located between the NPU 100, the memory 200, the camera adjustment unit 1020, the sensing unit 1030, and the CPU 1080 shown in FIG. 11. Accordingly, the NPU 100, the memory 200, the camera adjustment unit 1020, the sensing unit 1030, and the CPU 1080 may communicate with each other through the system bus 1060 shown in FIG. 8.

The NPU 100 shown in FIG. 11 may include a plurality of processing elements 110, an SFU 150, an internal memory 120, a DMA 125, and an NPU controller 130 as illustrated in FIG. 8.

The internal memory 120 may include an input feature map storage unit, an output feature map storage unit, and a weight storage unit. Each storage unit should be understood as a concept for distinguishing stored data, and may be controlled by the DMA 125.

The memory 200 shown in FIG. 11 may include a machine code storage unit, an image storage unit, an output feature map storage unit, and a weight storage unit for each machine code.

As described above, a plurality of artificial neural network models may be used. As described above, each artificial neural network model may be converted into machine code by a compiler prepared in advance. For example, the compiler analyzes the size of data corresponding to each layer in an artificial neural network model. The compiler may generate machine code that efficiently uses the internal memory 120 in the NPU 100 and minimizes access to the memory 200 according to the analysis result.

Thus, machine code for each artificial neural network model can be generated. When a plurality of artificial neural network models is provided, machine codes may be generated in a plurality of sets. For example, a set of plurality of machine codes may include a first set of machine code for a first artificial neural network model using an input feature map of a first size (e.g., 200×200×3) and a second set of machine code for a second artificial neural network model using an input feature map of a second size (e.g., 320×320×3). Additionally, the set of plurality of machine codes may further include a third set of machine codes for a third artificial neural network model using an input feature map of a third size.

For example, the machine code storage unit in the memory 200 may store a set of compiled machine codes. In this case, the firmware storage unit in the NPU controller 130 may store only index information for a plurality of machine code sets.

For example, the firmware storage unit of the NPU controller 130 may store a set of compiled machine codes.

For example, the firmware storage unit of the NPU controller 130 may temporarily store only a specific machine code currently being processed among a set of a plurality of machine codes in the memory 200.

At the initializing stage of driving the movable device 1000, the CPU 1080 may load index information for a plurality of machine code sets from a firmware storage unit in the NPU controller 130 and store the index information in a cache memory in the CPU 1080.

The weight storage unit for each machine code in the memory 200 may store weights for machine codes corresponding to each artificial neural network model. For example, the weight storage unit for each machine code in the memory 200 may store a first set of weights for a first set of machine code corresponding to a first artificial neural network model and a second set of weights for a second set of machine code corresponding to a second artificial neural network model. Additionally, the weight storage unit for each machine code in the memory 200 may store a third set of weights for a third set of machine codes corresponding to a third artificial neural network model.

The CPU 1080 may command to store the captured video or a plurality of images in the image storage unit of the memory 200 through the system bus 1060 by controlling at least one of the first image sensor 1021-2, the first ISP 1021-4 of the first camera, the second image sensor 1022-2, and the second ISP 1022-4 of the second camera.

Then, the NPU 100 may retrieve a video or a plurality of images from the image storage unit of the memory 200 and store them in the input feature map storage unit of the internal memory 120 using the DMA 125 under the control of the NPU controller 130.

The CPU 1080 may receive altitude information (e.g., information above sea level or height from the ground) from the sensing unit 1030.

If the flight altitude is increased (i.e., the height of the movable device from the sea level or the ground is increased), since the size of the object in the image becomes smaller, the object may be detected by the NPU 100 with a confidence level lower than the first threshold value, or the detection may fail. Therefore, in order to increase the accuracy of detection or tracking, the CPU 1080 may select, from among a plurality of machine code sets, a plurality of machine code sets suitable for coping with the increased altitude. Next, the CPU 1080 may transfer index information on the selected set of a plurality of machine codes to the NPU 100.

Then, the NPU 100 may command to load a set of a plurality of machine codes selected from the firmware storage unit based on the received index information. Alternatively, the NPU 100 may command to load a set of a plurality of machine codes selected from the machine code storage unit in the memory 200 using the DMA 125 based on the received index information.

In addition, the NPU 100 may command to load weights for a set of a plurality of machine codes selected from the weight storage unit for each machine code in the memory 200 using the DMA 125 based on the received index information.

As described above, if the flight altitude is low, since the size of the object in the image is captured to be sufficient, a convolution operation of the first artificial neural network model may be performed using weights for a first set of machine code corresponding to the first artificial neural network model.

However, if the flight altitude is increased (i.e., the height of the movable device from the sea level or the ground is increased), since the size of an object in an image is captured relatively smaller, a convolution operation of the second artificial neural network model may be performed using weights for a second set of machine code corresponding to the second artificial neural network model.

As such, the convolution operation of the first artificial neural network model or the convolution operation of the second artificial neural network model may be selectively performed based on the size of an image or the size of an object in an image.

On the other hand, in order to increase the accuracy of detection or tracking when the flight altitude is raised, after generating control signals (e.g., determination data), the CPU may transmit the control signal to at least one of the first image sensor 1021-2 of the first camera, the first ISP 1021-4 of the first camera, the second image sensor 1022-2 of the second camera, and the second ISP 1022-4 of the second camera, via the camera adjustment unit 1020.

The control signal (e.g., determination data) may be used to adjust the resolution of the captured image by the first image sensor 1021-2 of the first camera 1021 or the second image sensor 1022-2 of the second camera.

The control signal (e.g., determination data) may be provided for the first ISP 1021-4 of the first camera 1021 or the second ISP 1022-4 of the second camera to downscale or upscale the captured image.

Specifically, when the flight altitude is low, the control signal (e.g., determination data) may increase the level of downscaling. For example, if the size of the original image is 2048×2048×3 and the flight altitude is lowered, the control signal (e.g., determination data) may be converted into a 320×320×3 image by increasing the level of downscaling. Conversely, when the flight altitude increases, the control signal (e.g., decision data) may lower the level of downscaling, so that the 2048×2048×3 original image may be converted into a 1920×1920×3 image. Alternatively, when the flight altitude is higher, the control signal (e.g., determination data) may command upscaling, and accordingly, the captured original image of 2048×2048×3 size can be converted into an image of 4096×4096×3 size as an example. The converted image may be stored in the image storage unit of the memory 200. Therefore, the size of data to be processed by the NPU 100 can be reduced. Accordingly, power consumption of the movable device 1000 may be reduced and flight time may be prolonged as the result.

On the other hand, after the NPU 100 retrieves a set of a plurality of selected machine codes from the firmware storage unit, the NPU 100 checks the predetermined number of tilings according to the machine code based on the index information received from the CPU 1080.

Next, the NPU 100 may divide the feature map into blocks according to the number of tilings of the converted image stored in the image storage unit of the memory 200 and store it in the input feature map storage unit in the internal memory 120 of the NPU 100 by using the DMA 125.

For example, if the flight altitude is low and resolution reduction or downscaling is performed to a high degree, the size of the converted image stored in the image storage unit of the memory 200 may be 640×640×3. In this case, the converted image of 640×640×3 size may be tiled with 4 blocks of 320×320×3 size. Thus, the NPU 100 divides the converted image of 640×640×3 size stored in the image storage unit of the memory 200 into 4 blocks (e.g., first block, second block, third block, and fourth block) and stores the first block having a size of 320×320×3 in the input feature map storage unit of the internal memory 120 of the NPU 100 using the DMA 125.

Then, the PEs 110 of the NPU 100 may read the first block from the input feature map storage unit of the internal memory 120, read the weights from the weight storage unit of the internal memory 120, and perform a convolution operation. Next, the PEs 110 of the NPU 100 may read the second block from the input feature map storage unit of the internal memory 120, read the weights from the weight storage unit of the internal memory 120, and perform a convolution operation.

The PEs 110 of the NPU 100 store the output feature map generated by performing the convolution operation in the output feature map storage unit of the internal memory 120.

Figure 12A:
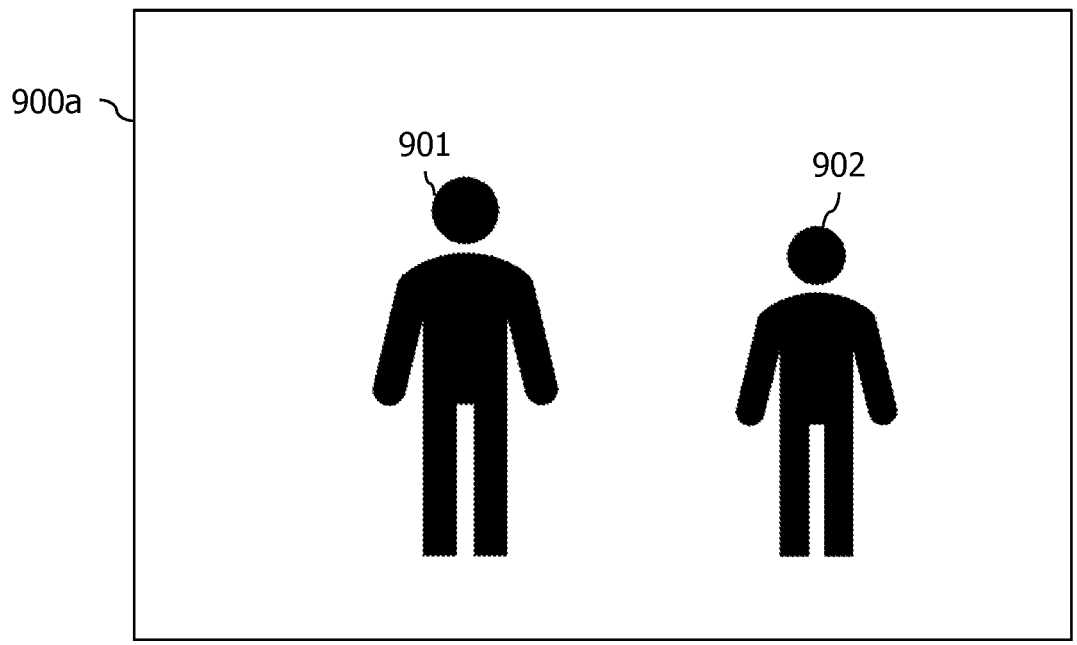
FIGS. 12A and 12B are illustrative diagrams illustrating examples of images including a couple of subjects.
Figure 12B:
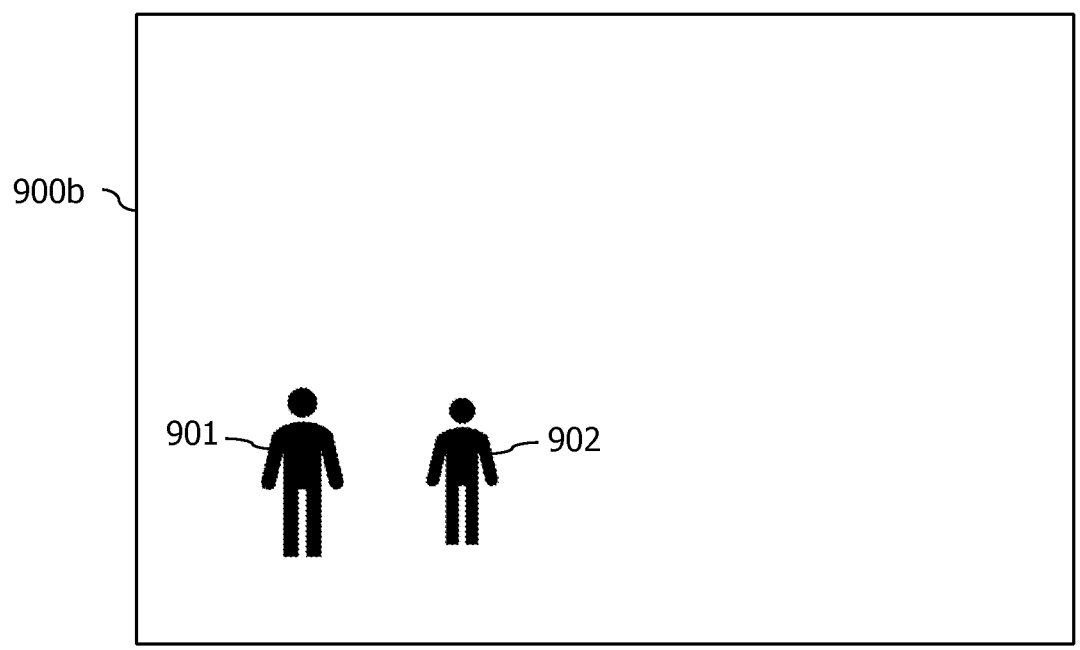

FIGS. 12A and 12B are illustrative diagrams illustrating examples of images including a subject.

An image 900A shown in FIG. 12A may be, for example, an image captured by the first camera 1021 or the second camera 1022 when the flight altitude of the movable device is low. Since the flight altitude is low, the first subject 901 and the second subject 902 may appear relatively large in size in the captured image 900a.

As such, since the sizes of the first subject 901 and the second subject 902 appear relatively large, they can be detected well even using the first artificial neural network model.

Meanwhile, the image 900b shown in FIG. 12B may be, for example, an image captured by the first camera 1021 or the second camera 1022 when the flight altitude of the movable device is high. Since the flight altitude is high, the first subject 901 and the second subject 902 may appear relatively small in size in the captured image 900b.

As such, since the first subject 901 and the second subject 902 appear relatively small in size, a confidence level of a result of detecting or tracking the first subject 901 and the second subject 902 in the image 900B using the first artificial neural network model may be lower than a first threshold value.

In this case, in order to increase the accuracy of the detection or tracking, the CPU 1080 may transmit a control signal requesting the first ISP 1021-4 or the second ISP 1022-4 to provide an image with an input feature map size for the second artificial neural network model based on the altitude information obtained from the sensing unit 1030. Then, the first ISP 1021-4 or the second ISP 1022-4 may downscale the image to a size according to the control signal and store the image in the image storage unit of the memory 200.

Also, the CPU 1080 may select a second artificial neural network model based on the altitude information obtained from the sensing unit 1030. In addition, the CPU 1080 may transfer index information on a set of machine codes corresponding to the selected second artificial neural network model to the NPU 100.

Then, the NPU controller 130 may load a set of a plurality of machine codes selected from a firmware storage unit or a machine code storage unit in the memory 200 based on the index information. In addition, the NPU controller 130 may load weights for a set of a plurality of machine codes selected from the weight storage unit for each machine code in the memory 200 using the DMA 125 based on the received index information.

Thereafter, the NPU controller 130 may divide the PEs 110 into PEs of a first group (i.e., a first portion) and PEs of a second group (i.e., a second portion). In other words, the NPU controller 130 may select PEs of a second group (i.e., a second portion) from among the PEs 110. Then, the PEs of the second group may perform a second operation for the second artificial neural network model.

On the other hand, the artificial neural network model and weights for each input feature map size are summarized in the table below.

TABLE 1

| Model Name | Input Feature Map Size | Set of Machine Code | Index of Machine Code Set | Weights |
|---|---|---|---|---|
| First Neural Network Model | 200 × 200 | Set 1 Machine Code | 01 | Set 1 Weight |
| Second Neural Network Model | 320 × 320 | Set 2 Machine Code | 02 | Set 2 Weight |
| Third Neural Network Model | 400 × 400 | Set 3 Machine Code | 03 | Set 3 Weight |

Figure 13:
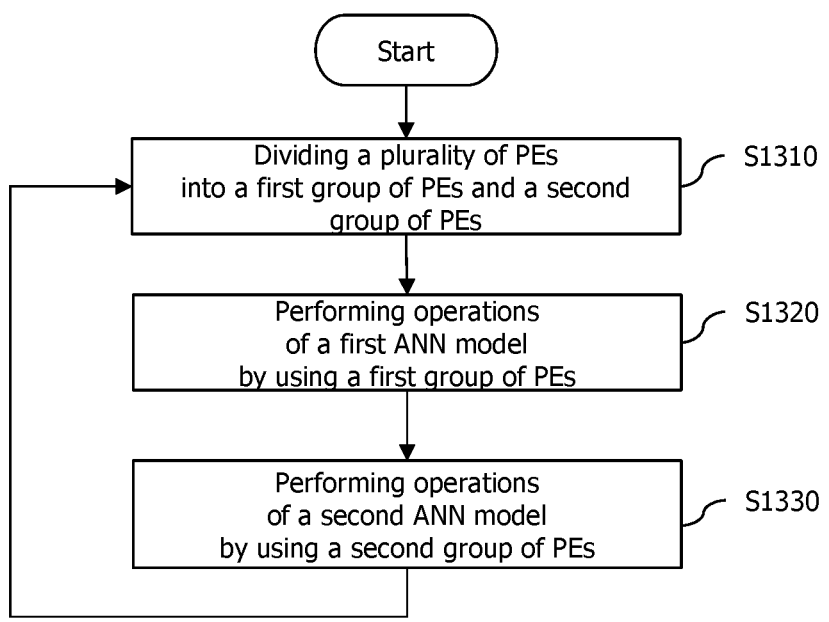
FIG. 13 is a flow diagram illustrating an approach according to the present disclosure.

FIG. 13 is a flow chart illustrating an approach according to the present disclosure.

Referring to FIG. 13, a plurality of PEs may be divided into PEs of the first group and PEs of the second group S1310.

Next, a first artificial neural network model may be calculated using the PEs of the first group S1320. That is, the PEs of the first group may perform a convolution operation of the first artificial neural network model.

Next, a second artificial neural network model may be calculated using the PEs of the second group S1330. That is, the PEs of the second group may perform a convolution operation of the second artificial neural network model.

The entirety or a portion of the operation of the first artificial neural network model and the entirety or a portion of the operation of the second model may be performed sequentially or simultaneously.

The number of PEs in the first group and the number of PEs in the second group may be respectively adjusted.

For example, among the plurality of PEs, the number of PEs in the first group may decrease and the number of PEs in the second group may increase.

Conversely, among the plurality of PEs, the number of PEs in the second group may decrease and the number of PEs in the first group may increase.

The convolution operation of the first artificial neural network model or the convolution operation of the second artificial neural network model may be selectively performed based on the size of an image or the size of an object in an image.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived in addition to the examples described.

[National R&D Project Supporting This Invention]
  [Task Identification Number] 1711193247
  [Task Number] 2022-0-00248-002
  [Name of Ministry] Ministry of Science and ICT
  [Name of Project Management (Specialized) Institution] Institute of Information & Communications Technology Planning & Evaluation
  [Research Project Title] Development of Core Technology for PIM Artificial Intelligence Semiconductor (Design)
  [Research Task Title] Development of CXL-based PIM semiconductor technology for multiple DRAM modules considering memory consistency
  [Contribution Rate] 1/1
  [Name of Organization Performing the Task] DeepX Co., Ltd.
  [Research period15 minutes] 2023 Jan. 1~2023 Dec. 31

What is claimed is:

1. A neural processing unit (NPU) mounted on a movable device for detecting object from the movable device comprising:
a first circuitry provided for a plurality of processing elements (PEs) configured to process at least one of an operation of a first artificial neural network (ANN) model and an operation of a second ANN model different from the first ANN model to produce an inference result including an object detection or a tracking result, and to transmit the inference result to a CPU outside of the NPU, wherein the CPU processes the inference result to produce a determination data including an object detection performance data of the first ANN model and the second ANN model, respectively, and the CPU receives, from a sensing unit outside of the NPU, an objective data including information about a flight altitude, information about a size of an image, and a size of an object in the image, and wherein the determination data is transmitted, by the CPU, to a camera adjustment unit outside of the NPU including a plurality of cameras and a plurality of image signal processors (ISPs) to increase an accuracy of detection or tracking objects performed by the plurality of cameras, and wherein the CPU and the first circuitry of the NPU collaborate based on a determination based on the determination data and the objective data, to select, from a plurality of machine code sets stored in a memory outside of the NPU, a set of machine code as a representation of either the first ANN model or the second ANN model to be processed by the first circuitry provided for the plurality of PEs;
an internal memory configured to store a plurality sets of machine code each of which, respectively, corresponding to and as a representation of one of a plurality of ANN models including the first ANN model and the second ANN model; and
a second circuitry provided for a controller configured to control the PEs and the internal memory in a processing order of the NPU that is determined based on data locality information, information about a structure of the first ANN model and the second ANN model, or information about a structure of the NPU to be used,
wherein the flight altitude is a height from sea level or height from ground from which the movable device is located, wherein the determination is whether or not the object detection performance data is suitable for the objective data.

2. The NPU of claim 1, wherein the object detection performance data includes information whether an object is detected with a confidence level lower than a first threshold.

3. The NPU of claim 1,
wherein the object detection performance data of each of the first ANN model and the second ANN model is determined based on a size of an image or a size of an object in the image.

4. The NPU of claim 1, wherein the controller generates a control signal based on the determination data.

5. The NPU of claim 1,
wherein the PEs pauses or deactivates the operation of the first ANN model and then performs the operation of the second ANN model according to a control signal, or
wherein the PEs pauses or deactivates the operation of the second ANN model and then performs the operation of the first ANN model according to the control signal.

6. The NPU of claim 1,
wherein the PEs comprises:
a first portion performing the operation of the first ANN model according to a control signal, or
a second portion performing the operation of the second ANN model according to the control signal.

7. The NPU of claim 6,
wherein according to the control signal, a first subset of PEs in the first portion are deallocated from the first portion and the first subset of PEs are allocated to become a part of the second portion.

8. The NPU of claim 6,
wherein according to the control signal, a second subset of PEs in the second portion is deallocated from the second portion and the second subset of PEs are allocated to become a part of the first portion.

9. A neural processing unit (NPU) mounted on a movable device for detecting object from the movable device comprising:
a first circuitry provided for a plurality of processing elements (PEs) which performs at least one of operations of a first artificial neural network (ANN) model and a second ANN model, to produce an inference result including an object detection or a tracking result, and to transmit the inference result to a CPU outside of the NPU, wherein the CPU processes the inference result to produce a determination data including an object detection performance data of the first ANN model and the second ANN model, respectively, and the CPU receives, from a sensing unit outside of the NPU, an objective data including information about a size of an image, and a size of an object in the image, and wherein the determination data is transmitted, by the CPU, to a camera adjustment unit outside of the NPU including a plurality of cameras and a plurality of image signal processors (ISPs) to increase an accuracy of detection or tracking objects performed by the plurality of cameras, and wherein the CPU and the first circuitry of the NPU collaborate based on a determination based on the determination data and the objective data, to select, from a plurality of machine code sets stored in a memory outside of the NPU, a set of machine code as a representation of either the first ANN model or the second ANN model to be processed by the first circuitry provided for the plurality of PEs;
an internal memory configured to store a plurality of sets of machine code each of which, respectively, corresponding to and as a representation of one of a plurality of ANN models including the first ANN model and the second ANN model; and
a second circuitry provided for a controller configured to control the PEs and the internal memory in a processing order of the NPU that is determined based on data locality information, information about a structure of the first ANN model and the second ANN model, or information about a structure of the NPU to be used,
wherein the determination is whether or not the object detection performance data is suitable for the objective data.

10. The NPU of claim 9,
wherein the PEs comprises:
a first portion performing the operation of the first ANN model according to a control signal, or
a second portion performing the operation of the second ANN model according to the control signal.

11. NPU of claim 9,
wherein the PEs pauses or deactivates the operation of the first ANN model and then performs the operation of the second ANN model according to a control signal, or
wherein the PEs pauses or deactivates the operation of the second ANN model and then performs the operation of the first ANN model according to the control signal.

12. A neural processing unit (NPU) mounted on a movable device for detecting object from the movable device comprising:
an internal memory configured to store at least one set of machine code, among a plurality sets of machine codes, each of which corresponding to and as representative of one of a plurality of artificial neural network (ANN) models including a first ANN model and a second ANN model;
a first circuitry provided for a plurality of processing elements (PEs) which performs a convolution operation of at least one ANN model of the plurality of ANN models to produce an inference result including an object detection or a tracking result, and to transmit the inference result to a CPU outside of the NPU, wherein the CPU processes the inference result to produce a determination data including an object detection performance data of the plurality of ANN models, respectively, and the CPU receives, from a sensing unit outside of the NPU, an objective data including information about a flight altitude, information about a size of an image, and a size of an object in the image, and wherein the determination data is transmitted, by the CPU, to a camera adjustment unit outside of the NPU including a plurality of cameras and a plurality of image signal processors (ISPs) to increase an accuracy of detection or tracking objects performed by the plurality of cameras, and wherein the CPU and the first circuitry of the NPU collaborate based on a determination based on the determination data and the objective data, to select, from a plurality of machine code sets stored in a memory outside of the NPU, a set of machine code as a representation of either the first ANN model or the second ANN model to be processed by the first circuitry provided for the plurality of PEs; and
a second circuitry provided for a controller configured to control the plurality of PEs and the internal memory in a processing order of the NPU that is determined based on data locality information, information about a structure of the first ANN model and the second ANN model, or information about a structure of the NPU to be used, wherein the plurality of ANN models are configured to use at least one image obtained from the plurality of cameras which are mounted on the movable device as input, wherein a first portion among the PEs is allocated to perform a first operation for the first ANN model, wherein a second portion among the PEs is allocated to perform a second operation for the second ANN model, wherein the flight altitude is a height from seal level or height from ground from which the movable device is located, wherein the determination is whether or not the object detection performance data is suitable for the objective data, and wherein the first portion and the second portion are sequentially or simultaneously determined according to a control signal.

13. The NPU of claim 12,
wherein the control signal allows the PEs to perform switching between the first portion and the second portion.

14. The NPU of claim 12,
wherein the control signal allows the plurality of PEs to allocate or deallocate the second portion.

15. The NPU of claim 12,
wherein the control signal is generated based on a first event.

16. The NPU of claim 15,
wherein the first event is generated:
when the flight altitude is measured to be greater than a pre-determined upper threshold value, or
when an object in at least one image is determined to be smaller than a pre-determined lower limit threshold.

17. The NPU of claim 12,
wherein the first ANN model is set to consume lower power than the second ANN model, and the second ANN model is set to consume more power than the first ANN model.

18. The NPU of claim 12,
wherein according to a control signal, a first subset of PEs in the first portion is deallocated from the first portion and the first subset of PEs is allocated to become a part of the second portion.

19. The NPU of claim 12,
wherein based on a control signal, a second subset of PEs in the second portion is deallocated from the second portion and the second subset of PEs is allocated to become a part of the first portion.

20. A method for operating a neural processing unit (NPU) mounted on a movable device for detection object, the method comprising:
operating a first artificial neural network (ANN) model using a first group of processing elements among a plurality of processing elements (PEs) according to a first control signal; and
operating a second ANN model, which is different from the first ANN model, using a second group of PEs among the plurality of PEs according to a second control signal,
wherein a set of machine code, corresponding to and as a representation of either the first ANN model or the second ANN model is selected, from a plurality sets of machine code each of which, respectively, corresponding to and as a representation of one of a plurality of ANN models including the first ANN model and the second ANN model, based on a determination on a first determination data including an object detection performance data of the first ANN model and the second ANN model, respectively, and an objective data including information about a flight altitude and information about a size of an image and a size of an object in the image, wherein the flight altitude is a height from seal level or height from ground from which the movable device is located, wherein the determination is whether or not the object detection performance data is suitable for the objective data, wherein the determination gives rise to the first control signal and the second control signal, and the determination data is used to adjust a plurality of cameras mounted on the movable device, wherein the determination is based on a determination data produced by a central processing unit (CPU) outside of the NPU on processing an inference result which is produced based on results of prior operations of the first ANN model and the second ANN model, wherein the determination data includes an object detection performance data of the first ANN model and the second ANN model, respectively, and the CPU receives, from a sensing unit outside of the NPU, an objective data including information about a flight altitude, information about a size of an image, and a size of an object in the image, and wherein the determination data is transmitted, by the CPU, to a camera adjustment unit outside of the NPU including a plurality of cameras and a plurality of image signal processors (ISPs) to increase an accuracy of detection or tracking objects performed by the plurality of cameras, and wherein the CPU and a first circuitry of the NPU collaborate based on the determination based on the determination data and the objective data, to select, from a plurality of machine code sets stored in a memory outside of the NPU, a set of machine code as a representation of either the first ANN model or the second ANN model to be processed by the first circuitry of the NPU provided for the plurality of PEs,
wherein the operations of the first ANN model and the second ANN model are performed sequentially or simultaneously, and in a processing order of the NPU that is determined based on data locality information, information about a structure of the first ANN model and the second ANN model, or information about a structure of the NPU to be used.

21. The method of claim 20,
further comprising: dividing the plurality of PEs into the first group of PEs and the second group of PEs.

22. The method of claim 20,
further comprising: adjusting a first number of PEs of the first group and a second number of PEs of the second group, respectively, according to a second control signal based on a second determination data.

23. The method of claim 20,
wherein among the plurality of PEs, a first number of PEs of the first group is reduced and a second number of PEs of the second group is increased, according to a third control signal based on a third determination data.

24. The method of claim 20,
wherein among the plurality of PEs, a second number of PEs of the second group is reduced and a first number of PEs of the first group is increased, according to a fourth control signal based on a fourth determination data.

* * * * *